(12) United States Patent
Jain et al.

(10) Patent No.: US 12,170,624 B2
(45) Date of Patent: Dec. 17, 2024

(54) TECHNOLOGIES THAT PROVIDE POLICY ENFORCEMENT FOR RESOURCE ACCESS

(71) Applicant: Intel Corporation, Santa Clara, CA (US)

(72) Inventors: Anjali Singhai Jain, Portland, OR (US); Daniel Daly, Santa Barbara, CA (US); Sridhar Samudrala, Portland, OR (US); Linden Cornett, Portland, OR (US); Phani Burra, Beaverton, OR (US); Brett Creeley, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 322 days.

(21) Appl. No.: 17/492,420

(22) Filed: Oct. 1, 2021

(65) Prior Publication Data

US 2022/0029929 A1 Jan. 27, 2022

Related U.S. Application Data

(60) Provisional application No. 63/145,327, filed on Feb. 3, 2021, provisional application No. 63/122,896, filed on Dec. 8, 2020.

(51) Int. Cl.
*H04L 47/762* (2022.01)
*H04L 9/40* (2022.01)
(Continued)

(52) U.S. Cl.
CPC ........ *H04L 47/762* (2013.01); *H04L 47/2425* (2013.01); *H04L 47/781* (2013.01);
(Continued)

(58) Field of Classification Search
CPC .............. H04L 47/762; H04L 47/2425; H04L 47/781; H04L 47/803; H04L 63/0428;
(Continued)

(56) References Cited

U.S. PATENT DOCUMENTS

| 8,839,370 B2 | 9/2014 | Singh et al. |
| 10,552,274 B1 | 2/2020 | Zhao et al. |

(Continued)

FOREIGN PATENT DOCUMENTS

| CN | 112513988 A | 3/2021 |
| WO | 2020030311 A1 | 2/2020 |
| WO | 2020041569 A1 | 2/2020 |

OTHER PUBLICATIONS

"HTTP and gRPC Transcoding", AIP-127, https://google.aip.dev/127, Last updated Aug. 22, 2019, 3 pages.
(Continued)

*Primary Examiner* — Benjamin M Thieu
(74) *Attorney, Agent, or Firm* — Compass IP Law PC

(57) ABSTRACT

Examples described herein relate to one or more processors, when operational, to execute instructions stored in memory device, to cause performance of: execute a driver that is to: negotiate capabilities of hardware with a control plane for a virtualized execution environment and limit capabilities of the hardware available to the virtualized execution environment based on a service level agreement (SLA) associated with the virtualized execution environment. In some examples, the driver is to advertise hardware capabilities requested by the virtualized execution environment. In some examples, the control plane is to set capabilities of a hardware available to the virtualized execution environment based on the SLA.

20 Claims, 15 Drawing Sheets

---

CONFIGURE DEVICE TO LIMIT CAPABILITIES AVAILABLE TO A VIRTUALIZED EXECUTION ENVIRONMENT BASED ON ASSOCIATED SERVICE LEVEL AGREEMENT
1302

CONFIGURE DEVICE DRIVER TO RESTRICT CAPABILITIES AVAILABLE FROM THE DEVICE TO THE VIRTUALIZED EXECUTION ENVIRONMENT BASED ON ASSOCIATED SERVICE LEVEL AGREEMENT
1304

(51) Int. Cl.
  *H04L 47/2425* (2022.01)
  *H04L 47/78* (2022.01)
  *H04L 47/80* (2022.01)
(52) U.S. Cl.
  CPC ........ *H04L 47/803* (2013.01); *H04L 63/0428* (2013.01); *H04L 63/101* (2013.01); *H04L 63/166* (2013.01)
(58) Field of Classification Search
  CPC ..... H04L 63/101; H04L 63/166; H04L 47/83; G06F 21/53
  See application file for complete search history.

(56) References Cited

U.S. PATENT DOCUMENTS

| | | | |
|---|---|---|---|
| 11,336,627 | B2 | 5/2022 | Manasse et al. |
| 2010/0232429 | A1 | 9/2010 | Rao et al. |
| 2011/0299409 | A1 | 12/2011 | Vobbilisetty et al. |
| 2014/0280737 | A1 | 9/2014 | Bicket et al. |
| 2015/0067819 | A1 | 3/2015 | Shribman et al. |
| 2015/0180736 | A1 | 6/2015 | Leung |
| 2018/0181763 | A1 | 6/2018 | Gunda |
| 2018/0295045 | A1 | 10/2018 | Bali et al. |
| 2019/0044812 | A1 | 2/2019 | Loftus et al. |
| 2019/0044994 | A1 | 2/2019 | Sarangam et al. |
| 2019/0190891 | A1 | 6/2019 | Pillai et al. |
| 2019/0306282 | A1 | 10/2019 | Masputra et al. |
| 2020/0053064 | A1 | 2/2020 | Oprisan et al. |
| 2020/0099628 | A1 | 3/2020 | Parikh et al. |
| 2020/0133795 | A1 | 4/2020 | Rhodes et al. |
| 2020/0236140 | A1 | 7/2020 | Srinivasan et al. |
| 2020/0287813 | A1 | 9/2020 | Kutch et al. |
| 2020/0319812 | A1 | 10/2020 | He et al. |
| 2021/0103403 | A1 | 4/2021 | He et al. |
| 2021/0117242 | A1 | 4/2021 | Groenendaal et al. |
| 2021/0194828 | A1 | 6/2021 | He et al. |
| 2021/0243247 | A1 | 8/2021 | He et al. |
| 2021/0266253 | A1 | 8/2021 | He et al. |
| 2021/0352044 | A1 | 11/2021 | Asveren et al. |

OTHER PUBLICATIONS

"Improving Network Monitoring and Management with Programmable Data Planes", ONF, https://opennetworking.org/news-and-events/blog/improving-network-monitoring-and-management-with-programmable-data-planes/, Sep. 25, 2015, 5 pages.
"Intel® Ethernet Adaptive Virtual Function (AVF) Hardware Architecture Specification (HAS)", Intel Networking Division, Revision: 1.0, Feb. 2018, 90 pages.
"Introduction to Intel Ethernet Flow Director and Memcached Performance", Intel White Paper, Oct. 13, 2014, 6 pages.
"OpenStack Networking Guide", openstack, https://docs.openstack.org/mitaka/networking-guide/, updated Aug. 16, 2019, 3 pages.
"P4-16 Language Specification", version 1.2.1, The P4 Language Consortium, Jun. 11, 2020, 113 pages.
"Trellis", Overview, Trellis is an open-source multi-purpose L2/L3 leaf-spine switching fabric., https://docs.trellisfabric.org/1.12/index.html, © Copyright 2019, Open Networking Foundation, 4 pages.
Xing, Li, et al., "Hyperscale rte_flow toward production is really happening", DPDK https://dpdkbordeaux2019.sched.com/event/RmZG, Sep. 20, 2019, 25 pages.
Zhang, Jiao, et al., "Fast Switch-Based Load Balancer Considering Application Server States", IEEE, https://ieeexplore.ieee.org/document/9061132.
"Networking architecture", Security Guide Docmentation, https://docs.openstack.org/security-guide/networking/architecture.html, Jul. 27, 2021, 6 pages.
"Transcoding HTTP/JSON to gRPC", Google Cloud Endpoints, cloud.google.com/endpoints/docs/grpc/transcoding, downloaded from the internet Jul. 28, 2021, 14 pages.
Bosshart, Pat, et.al., "P4: Programming Protocol-Indpendent Packet Processors", ACM SIGCOMM, Computer Communication Review, vol. 44, No. 3, Jul. 2014, 8 pages.
Colyer, Adrian, "Snap: a microkernel approach to host networking", the morning paper, https://blog.acolyer.org/2019/11/11/snap-networking, Nov. 11, 2019, 8 pages.
Crilly, Liam, "Introducing a Technoloy Preview of NGINX Support for QUIC and HTTP/3", https://www.nginx.com/blog/introducing-technology-preview-nginx-support-for-quic-http-3/, Jun. 10, 2020, 10 pages.
Diptanu Gon Choudhury, 'XDP-Programmable Data Path in the Linux Kernel', ;login: Spring 2018, vol. 43, No. 1, pp. 26-30, 2018, 6 pages.
Intel, "Intel Ethernet Adaptive Virtual Function (AVF) Hardware Architecture Specification (HAS)", Networking Division, Revision: 1.0, Feb. 2018, 90 pages.
Intel, "Introduction to Intel® Ethernet Flow Director and Memcached Performance", White Paper, Intel® Ethernet Flow Director and Memcached Performance, Copyright © 2014 Intel Corporation, 6 pages.
International Search Report and Written Opinion for PCT Patent Application No. PCT/US21/65177, Mailed Apr. 25, 2022, 10 pages.
International Search Report and Written Opinion for PCT Patent Application No. PCT/US22/11045, Mailed Apr. 25, 2022, 11 pages.
Irfan, Talal, "AF_XDP101L Getting Started With an In-Kernel network stack Bypass", Published in Emumba, https://blog.emumba.com/af-xdp-101-getting-started-with-an-in-kernel-network-stack-bypass-6e6901a285c8, Jun. 24, 2020, 10 pages.
Iyengar, Ed, et. al., "QUIC: A UDP-Based Multiplexed and Secure Transport draft-ietf-quic-transport-29", https://datatracker.ietf.org/doc/html/draft-ietf-quic-transport-29#page-23, Jun. 10, 2020, 187 pages.
Karlsson Magnus, et. al., 'The path to DPDK speeds for AF XDP', Linux Plumbers Conference, 2018, 9 pages.
Karlsson, Magnus, "Performance I40E 64-Byte Packets", Fast Packet Processing in Linux with AF_XDP, FOSDEM 2018, 1 page.
Li Xing, Alibaba, et. al., "Hyperscale rte_flow toward productoin is really happening" DPDK Data Pane Development Kit, DPDK Summit Bordeaux 2019, 25 pages.
Marcelo Abranches, et. al., 'A Userspace Transport Stack Doesn't Have to Mean Losing Linux Processing', 2020 IEEE Conference on Nettwork Function Virtualization and Software Defined Networks (NFV-SDN), Dec. 24, 2020, 7 pages.
MVS, Janakiram, "Service Mesh—The New Battleground For the Platfor Wars", Sep. 20, 2020, 8 pages.
Nguyen Van Tu, et. al., 'Accelerating Virtual Network Functions with Fast-Slow Path Architecture using express Data Path', IEEE Transactions on Network and Service Management vol. 17. Issue 3, Jun. 5, 2020, 13 pages.
P4.org, "Improving Network Monitoring and Management with Progammable Data Planes", ONF, https://opennetworking.org/news-and-events/blog/improving-network-monitoring-and-management-with-programmable-data-planes/, Sep. 25, 2015, 7 pages.
P4.org, "In-band Network Telemetry (INT) Dataplane Specification", Version 2.1, The P4.org Applications Working Group. Contributions from Alibaba, Arista, CableLabs, Cisco Systems, Dell, Intel, Marvell, Netronome, VMware, Nov. 11, 2020, 56 pages.
Peterson, Larry, "Trellis", Dashboard / Cord—Wiki Home / Project and Domains of Use, https://wiki.opecord.org/display/CORD/Trellis, Jul. 27, 2021, 3 pages.
Postel, J., " User Datagram Protocol", RFC 768, Aug. 28, 1980, 3 pages.
Wiggins, Adam, "The Twelve-Factor App", VII. Port binding, https://12factor.net/port-binding, Last updated 2017, 1 page.
Ian Pratt and Keir Fraser, Arsenic: A User-Accessible Gigabit Ethernet Interface, year 2001, IEEE, 0-7803-7016-3/01, pp. 67-76 (Year: 2001).
International Search Report and Written Opinion for PCT Patent Application No. PCT/US21/57130, Mailed Feb. 21, 2022, 10 pages.
Non-Published commonly owned U.S. Appl. No. 17/238,893, filed Apr. 23, 2021, 87 pages, Intel Corporation.
Notice of Allowance for U.S. Appl. No. 17/238,893, Mailed Feb. 9, 2022, 10 pages.

(56) References Cited

OTHER PUBLICATIONS

International Search Report and Written Opinion for PCT Patent Application No. PCT/US22/21795, Mailed Jun. 24, 2022, 12 pages.
First Office Action for U.S. Appl. No. 17/981,255, Mailed May 24, 2023, 7 pages.
Marcelo Abranches et al., 'A Userspace Transport Stack Doesn't Have to Mean Losing Linux Processing', 2020 IEEE Conference on Network Function Virtualization and Softwme Defined Networks (NFV-SDN), Dec. 24, 2020.
First Office Action for U.S. Appl. No. 17/544,699, Mailed Mar. 1, 2024, 27 pages.

TECHNOLOGIES THAT PROVIDE POLICY ENFORCEMENT FOR RESOURCE ACCESS

RELATED APPLICATION

The present application claims the benefit of a priority date of U.S. provisional patent application Ser. No. 63/122,896, filed Dec. 8, 2020 and U.S. provisional patent application Ser. No. 63/145,327, filed Feb. 3, 2021. The entire disclosures of those provisional applications are incorporated herein by reference.

BACKGROUND

In a datacenter, a device interface is provided to a tenant virtual machine (VM) to access devices such as network interface devices, accelerators, storage controllers, and so forth. In addition, when different VMs are permitted use of different devices and device capabilities, datacenters exercise control over computing resources available to a VM based on applicable Service Level Agreements (SLAs). In a data center, a VM could be deployed in different "T-shirt" sizes that provide different resources such as general usage VM, a VM used for Network Virtual Function Appliances, and so forth. A T-shirt size could refer to a particular network interface speed, particular central processing unit (CPU) capabilities, storage capabilities, or memory capabilities, among others. A complete passthrough or composed local area network (LAN) virtual function (VF) driver for a given device may exhibit properties based on the VM usage on a given server node. However, having a separate driver and device interface that works for different tenant hosting VM resource allocations may not be challenging to deploy at scale in a data center given the combinations of drivers and resource utilization. In some cases, Adaptive Virtual Functions (AVFs) may be used to allocate resources to VMs, but the tenant SLA enforcement may not be provided by AVFs.

DETAILED DESCRIPTION

Some examples describe a manner of limiting device capabilities available to a requester through a device driver according to an applicable service level agreement (SLA). In some examples, the device driver can limit capabilities requested. For example, a control plane executed by a device can limit capabilities available to the requester.

Figure 1:
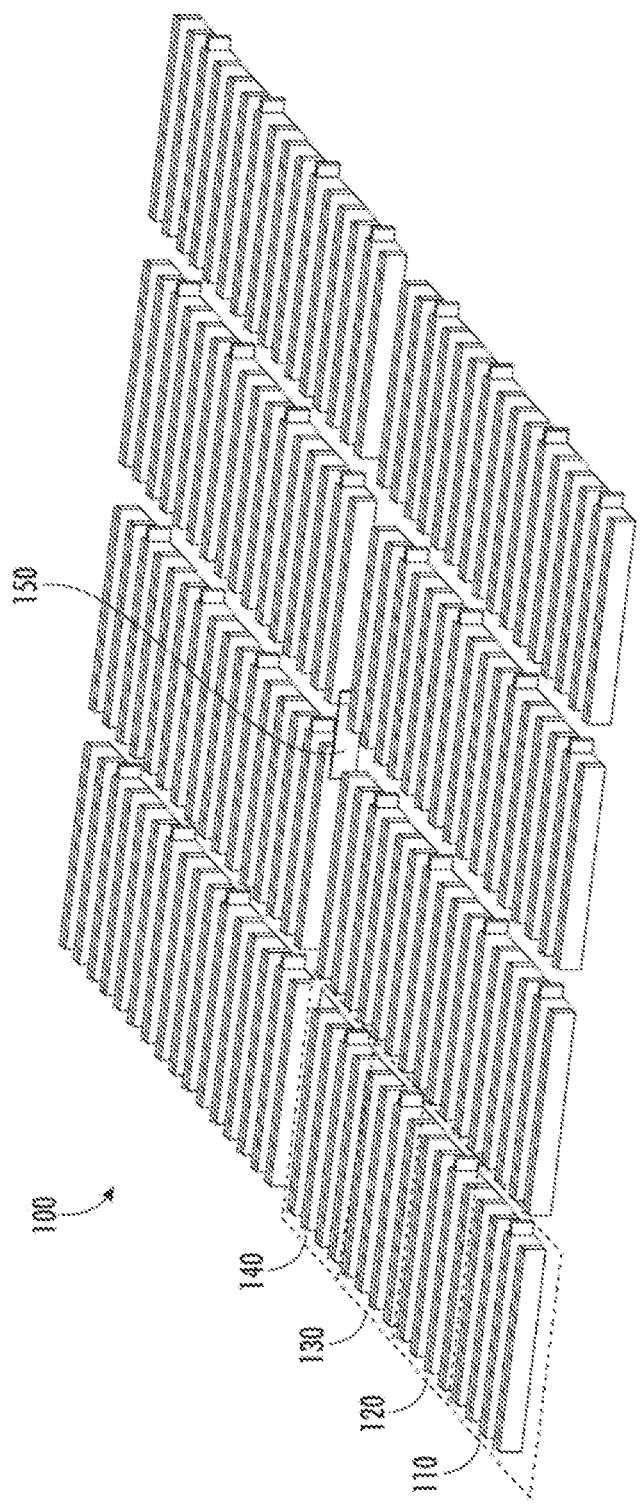
FIG. 1 is a simplified diagram of at least one example of a data center for executing workloads with disaggregated resources.

FIG. 1 depicts a data center in which disaggregated resources may cooperatively execute one or more workloads (e.g., applications on behalf of customers) that includes multiple systems 110, 120, 130, 140, a system being or including one or more rows of racks or trays. Of course, although data center 100 is shown with multiple systems, in some examples, the data center 100 may be embodied as a single system. As described in more detail herein, a rack houses multiple nodes, some of which may be equipped with one or more types of resources (e.g., memory devices, data storage devices, accelerator devices, general purpose processors, GPUs, xPUs, CPUs, field programmable gate arrays (FPGAs), or application-specific integrated circuits (ASICs)). Resources can be logically coupled or aggregated to form a composed node, which can act as, for example, a server to perform a job, workload or microservices.

Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or container or virtual machine deployment, and decentralized continuous microservice delivery. One or more microservices can execute on or using any resources described herein, such as resources of FIGS. 3-9.

Various examples can include a virtualized execution environment (VEE) that is executed by and utilizes resources described with respect to FIGS. 3-9. A VEE can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Various examples can include a serverless application or function (e.g., Function as a Service (FaaS)) that can be executed by or utilize available resources described with respect to FIGS. 1-9 as well as computing resources at a data center, edge computing device, or fog network device or in disaggregated computing and memory resources. For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device (e.g., forwarding element, router, switch, network interface controller) or accelerator, in addition or alternative to use of a server or general purpose computing platform.

Note that reference to virtualized execution environment, microservice, or serverless application can be used interchangeably so that reference to virtualized execution environment can refer to microservice and/or serverless application, reference to microservice can refer to virtualized execution environment and/or serverless application, and so forth.

In the illustrative example, the nodes in systems 110, 120, 130, 140 are connected to multiple system switches (e.g., switches that route data communications to and from nodes within the system). Switches can be positioned at the top of rack (TOR), end of row (EOR), middle of rack (MOR), or other. The system switches, in turn, connect with spine switches 150 that switch communications among systems (e.g., the systems 110, 120, 130, 140) in the data center 100. In some examples, the nodes may be connected with a fabric using standards described herein or proprietary standards. In other examples, the nodes may be connected with other fabrics, such as InfiniBand or Ethernet or optical. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different systems 110, 120, 130, 140. As such, some resources of a single node may be allocated to one managed node while other resources of the same node are allocated to a different managed node (e.g., one processor assigned to one managed node and another processor of the same node assigned to a different managed node).

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload can allow the operation and resource usage of the data center 100 relative to typical data centers comprised of hyperconverged servers containing compute, memory, storage and perhaps additional resources. For example, because nodes predominantly contain resources of a particular type, resources of a given type can be upgraded independently of other resources. Additionally, because different resource types (processors, memory, storage, accelerators, etc.) typically have different refresh rates, greater resource utilization, and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
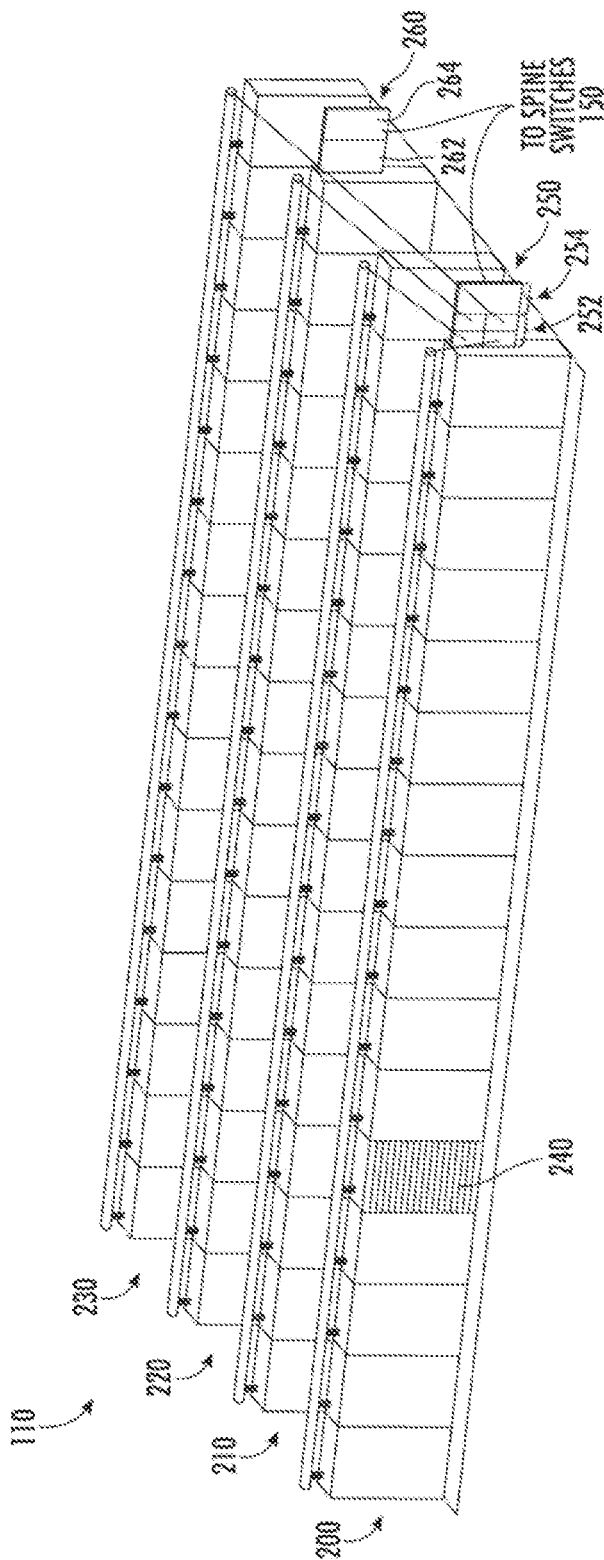
FIG. 2 is a simplified diagram of at least one example of a system that may be included in a data center.

FIG. 2 depicts a system. A system can include a set of rows 200, 210, 220, 230 of racks 240. Rack 240 may house multiple nodes (e.g., sixteen nodes) and provide power and data connections to the housed nodes, as described in more detail herein. In the illustrative example, the racks in rows 200, 210, 220, 230 are connected to multiple system switches 250, 260. The system switch 250 includes a set of ports 252 to which the nodes of the racks of the system 110 are connected and another set of ports 254 that connect the system 110 to the spine switches 150 to provide connectivity to other systems in the data center 100. Similarly, the system switch 260 includes a set of ports 262 to which the nodes of the racks of the system 110 are connected and a set of ports 264 that connect the system 110 to the spine switches 150. As such, the use of the pair of switches 250, 260 provides an amount of redundancy to the system 110. For example, if either of the switches 250, 260 fails, the nodes in the system 110 may still maintain data communication with the remainder of the data center 100 (e.g., nodes of other systems) through the other switch 250, 260. Furthermore, in the illustrative example, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that the other systems 120, 130, 140 (as well as additional systems of the data center 100) may be similarly structured as, and have components similar to, the system 110 shown in and described in regard to FIG. 2 (e.g., a system may have rows of racks housing multiple nodes as described above). Additionally, while two system switches 250, 260 are shown, it should be understood that in other examples, systems 110, 120, 130, 140 may be connected to a different number of system switches, providing even more failover capacity. Of course, in other examples, systems may be arranged differently than the rows-of-racks configuration shown in FIGS. 1-2. For example, a system may be embodied as multiple sets of racks in which a set of racks is arranged radially, e.g., the racks are equidistant from a center switch.

Figure 3:
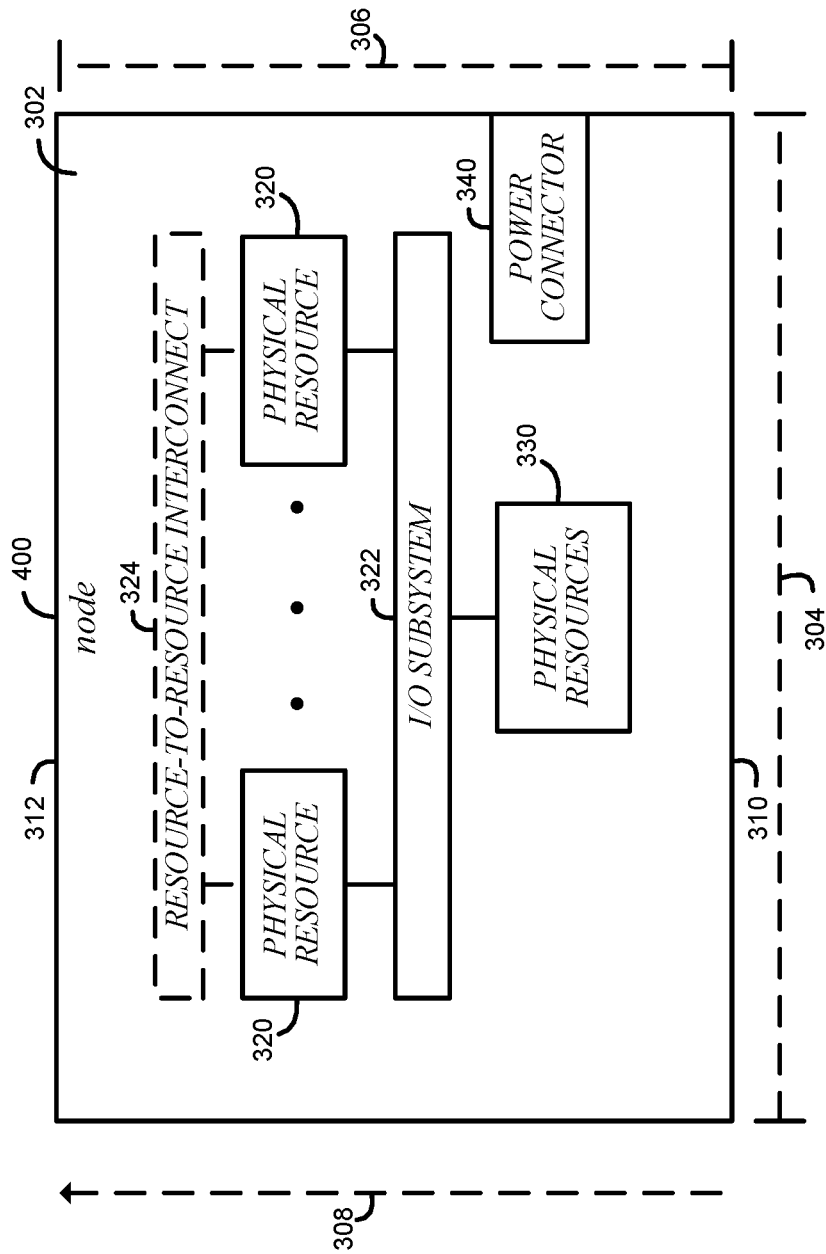
FIG. 3 is a simplified block diagram of at least one example of a top side of a node.

Referring now to FIG. 3, node 400, in the illustrative example, is configured to be mounted in a corresponding rack 240 of the data center 100 as discussed above. In some examples, node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8. For example, one or more microservices can execute on or using node 400, node 500, accelerator node 600, storage node 700, and/or memory node 800. As described herein, a storage node 700 or memory node 800 can be selected to store data for access by node 400, node 500, or accelerator node 600 to reduce a transit time of data to meet applicable service level agreement (SLA) parameters.

Although two physical resources 320 are shown in FIG. 3, it should be appreciated that the node 400 may include one, two, or more physical resources 320 in other examples. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in examples in which the node 400 is embodied as a compute node, as accelerator co-processors or circuits in examples in which the node 400 is embodied as an accelerator node, storage controllers in examples in which the node 400 is embodied as a storage node, or a set of memory devices in examples in which the node 400 is embodied as a memory node.

The node 400 also includes one or more additional physical resources 330 mounted to circuit board substrate 302. In the illustrative example, the additional physical resources include a network interface controller (NIC) as discussed in more detail below. Of course, depending on the type and functionality of the node 400, the physical resources 330 may include additional or other electrical components, circuits, and/or devices in other examples.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative example for memory system, the I/O subsystem 322 is embodied as, or otherwise includes, a double data rate 4 (DDR4) data bus or a DDR5 data bus.

In some examples, the node 400 may also include a resource-to-resource interconnect 324. The resource-to-resource interconnect 324 may be embodied as any type of communication interconnect capable of facilitating resource-to-resource communications. In the illustrative example, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), Compute Express Link (CXL), or other high-speed point-to-point interconnect utilized for resource-to-resource communications. See, for example, PCI Express Base Specification 1.0 (2002), as well as earlier versions, later versions, and variations thereof. See, for example, Compute Express Link Specification revision 2.0, version 0.7 (2019), as well as earlier versions, later versions, and variations thereof.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. In some examples, the node 400 includes local power supply (e.g., an on-board power supply) to provide power to the electrical components of the node 400. In some examples, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. In some examples, voltage regulators are placed on circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

Figure 4:
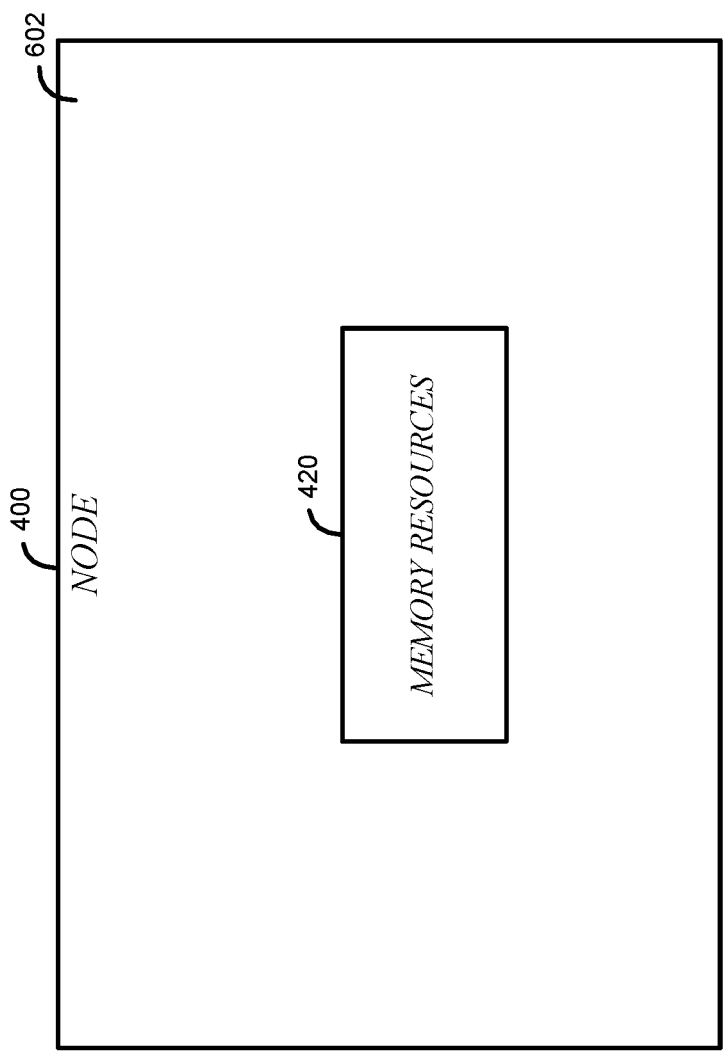
FIG. 4 is a simplified block diagram of at least one example of a bottom side of a node.

Referring now to FIG. 4, in addition to the physical resources 330 mounted on circuit board substrate 302, the node 400 also includes one or more memory devices 420. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some examples. Alternatively, in other examples, physical resource 320 may be communicatively coupled to memory device 420.

The memory devices 420 may be embodied as any type of memory device capable of storing data for the physical resources 320 during operation of the node 400, such as any type of volatile (e.g., dynamic random access memory (DRAM), etc.) or non-volatile memory.

In one example, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices (e.g., memory devices that use chalcogenide glass), multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory. The memory device may refer to the die itself and/or to a packaged memory product. In some examples, the memory device may comprise a transistor-less stackable cross point architecture in which memory cells sit at the intersection of word lines and bit lines and are individually addressable and in which bit storage is based on a change in bulk resistance.

Figure 5:
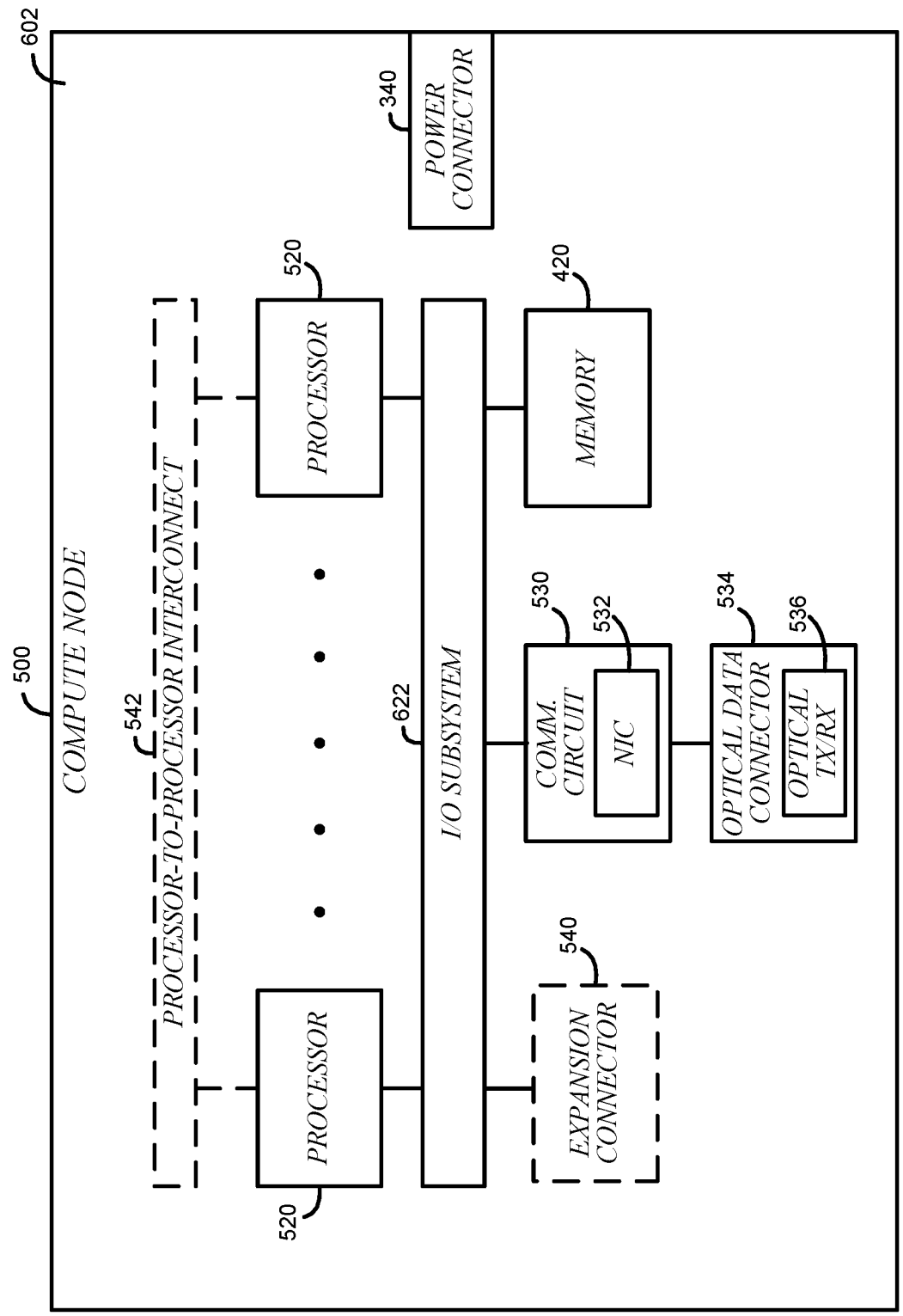
FIG. 5 is a simplified block diagram of at least one example of a compute node.

Referring now to FIG. 5, in some examples, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks. In the illustrative compute node 500, the physical resources 320 are embodied as processors 520. Although only two processors 520 are shown in FIG. 5, it should be appreciated that the compute node 500 may include additional processors 520 in other examples. Illustratively, the processors 520 are embodied as high-performance processors 520 and may be configured to operate at a relatively high power rating.

In some examples, the compute node 500 may also include a processor-to-processor interconnect 542. Processor-to-processor interconnect 542 may be embodied as any type of communication interconnect capable of facilitating processor-to-processor interconnect 542 communications. In the illustrative example, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an Ultra-Path Interconnect (UPI), or other high-speed point-to-point interconnect utilized for processor-to-processor communications (e.g., PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). In some examples, the NIC 532 may be embodied as part of a system-on-a-chip (SoC) that includes one or more processors, or included on a multichip package that also contains one or more processors. In some examples, the NIC 532 may include a local processor (not shown) and/or a local memory (not shown) that are both local to the NIC 532. In such examples, the local processor of the NIC 532 may be capable of performing one or more of the functions of the processors 520. Additionally or alternatively, in such examples, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

Some examples of a NIC 532 are part of an Infrastructure Processing Unit (IPU) or data processing unit (DPU) or utilized by an IPU or DPU. An IPU or DPU can include a network interface, memory devices, and one or more programmable or fixed function processors (e.g., CPU or XPU) to perform offload of operations that could have been performed by a host CPU or XPU or remote CPU or XPU. In some examples, the IPU or DPU can perform virtual switch operations, manage storage transactions (e.g., compression, cryptography, virtualization), and manage operations performed on other IPUs, DPUs, servers, or devices.

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative example, the optical transceiver 536 may form a portion of the communication circuit 530 in other examples.

In some examples, the compute node 500 may also include an expansion connector 540. In such examples, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits. Note that reference to GPU or CPU herein can in addition or alternatively refer to an XPU or xPU. An xPU can include one or more of: a GPU, ASIC, FPGA, or accelerator device.

Figure 6:
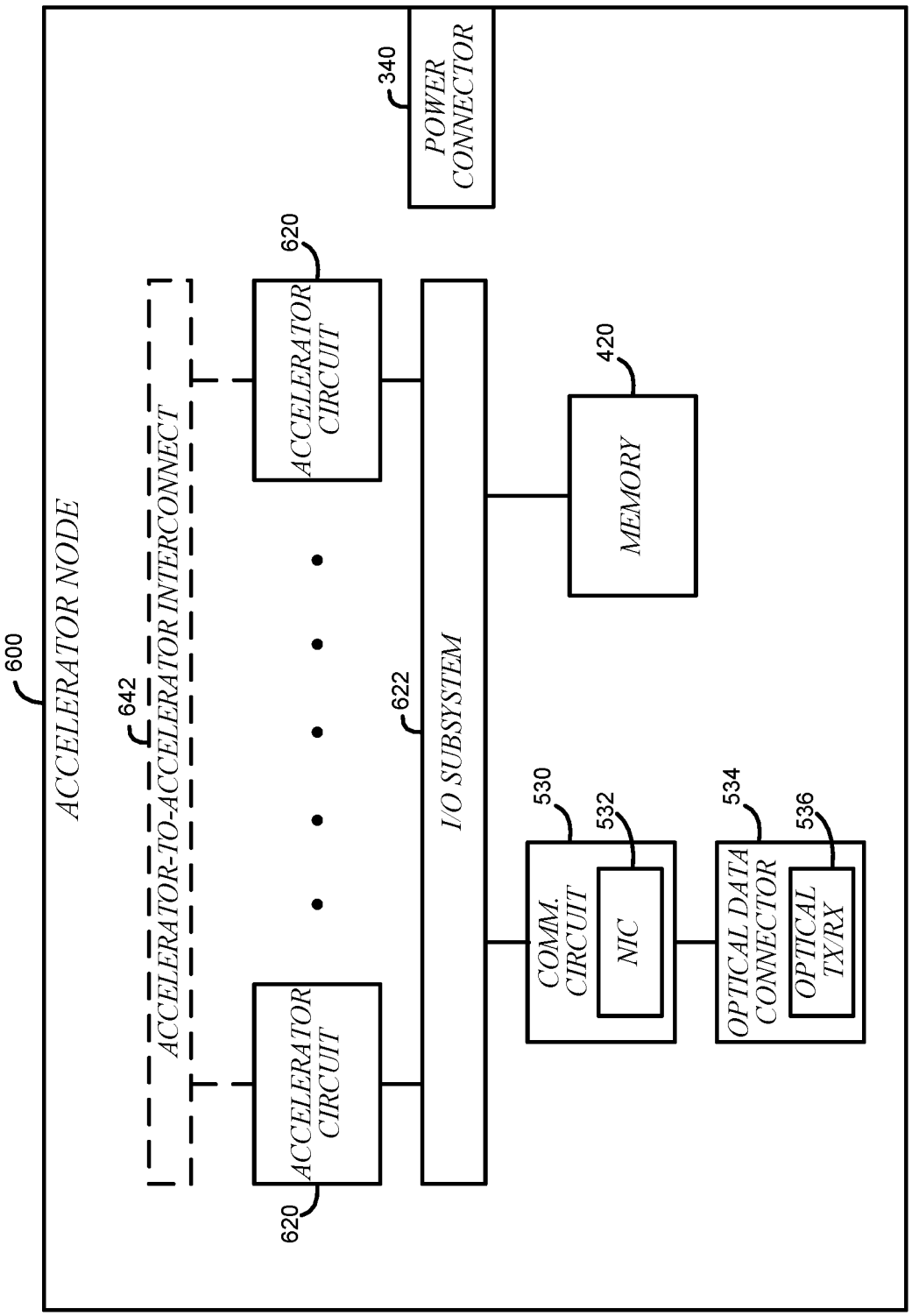
FIG. 6 is a simplified block diagram of at least one example of an accelerator node usable in a data center.

Referring now to FIG. 6, in some examples, the node 400 may be embodied as an accelerator node 600. The accelerator node 600 is configured to perform specialized compute tasks, such as machine learning, encryption, hashing, or other computational-intensive task. In some examples, for example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other examples. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, programmable processing pipeline (e.g., programmable by P4, C, Python, Broadcom Network Programming Language (NPL), or x86 compatible executable binaries or other executable binaries). Processors, FPGAs, other specialized processors, controllers, devices, and/or circuits can be used utilized for packet processing or packet modification. Ternary content-addressable memory (TCAM) can be used for parallel match-action or look-up operations on packet header content.

In some examples, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative example, the accelerator-to-accelerator interconnect 642 is embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect utilized for accelerator-to-accelerator communications. In some examples, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
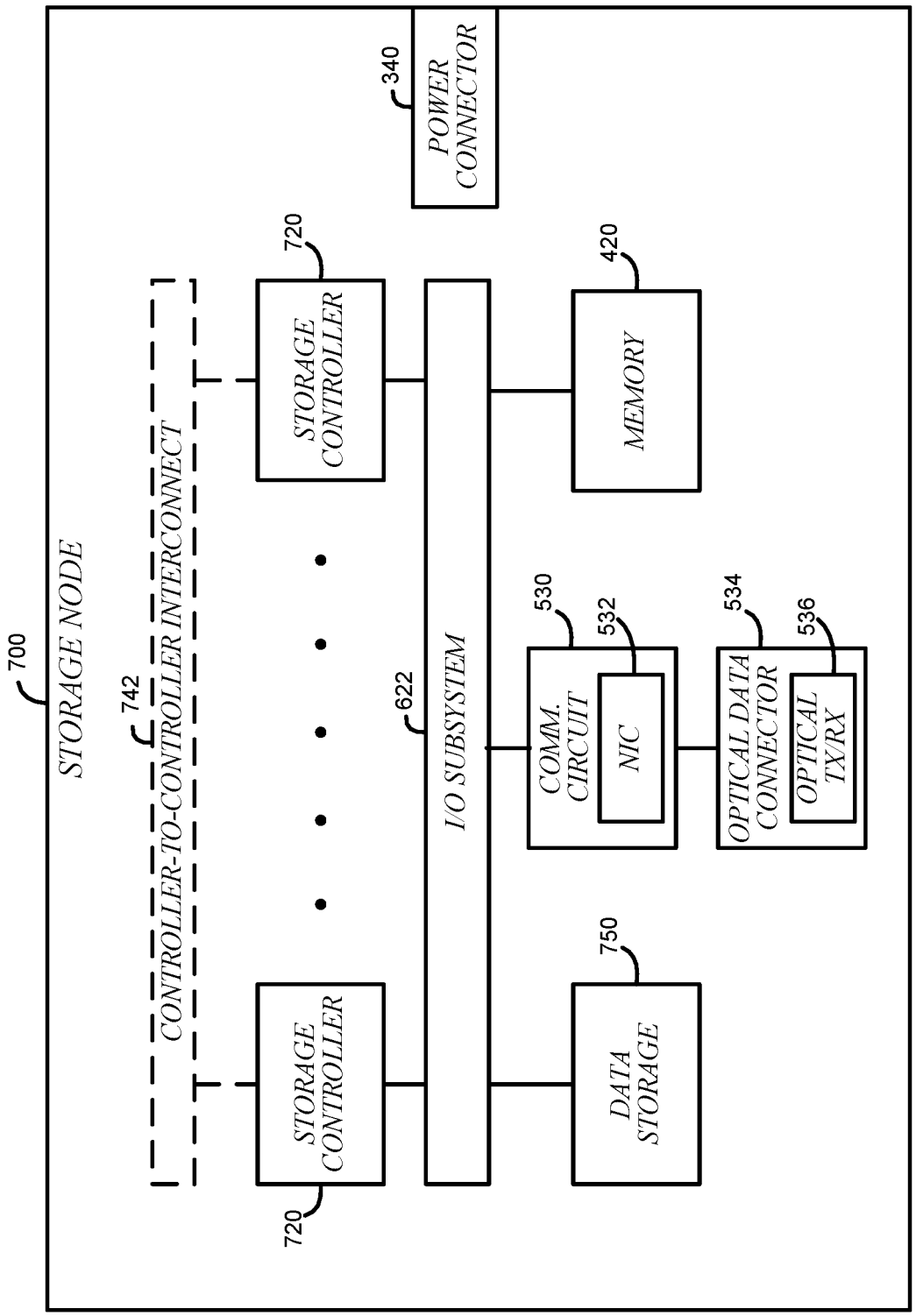
FIG. 7 is a simplified block diagram of at least one example of a storage node usable in a data center.

Referring now to FIG. 7, in some examples, the node 400 may be embodied as a storage node 700. The storage node 700 is configured in some examples to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other examples. The storage controllers 720 may be embodied as any type of processor, controller, or control circuit capable of controlling the storage and retrieval of data into/from the data storage 750 based on requests received via the communication circuit 530 or other components. In the illustrative example, the storage controllers 720 are embodied as relatively low-power processors or controllers.

In some examples, the storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. In the illustrative example, the controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect utilized for controller-to-controller communications.

Figure 8:
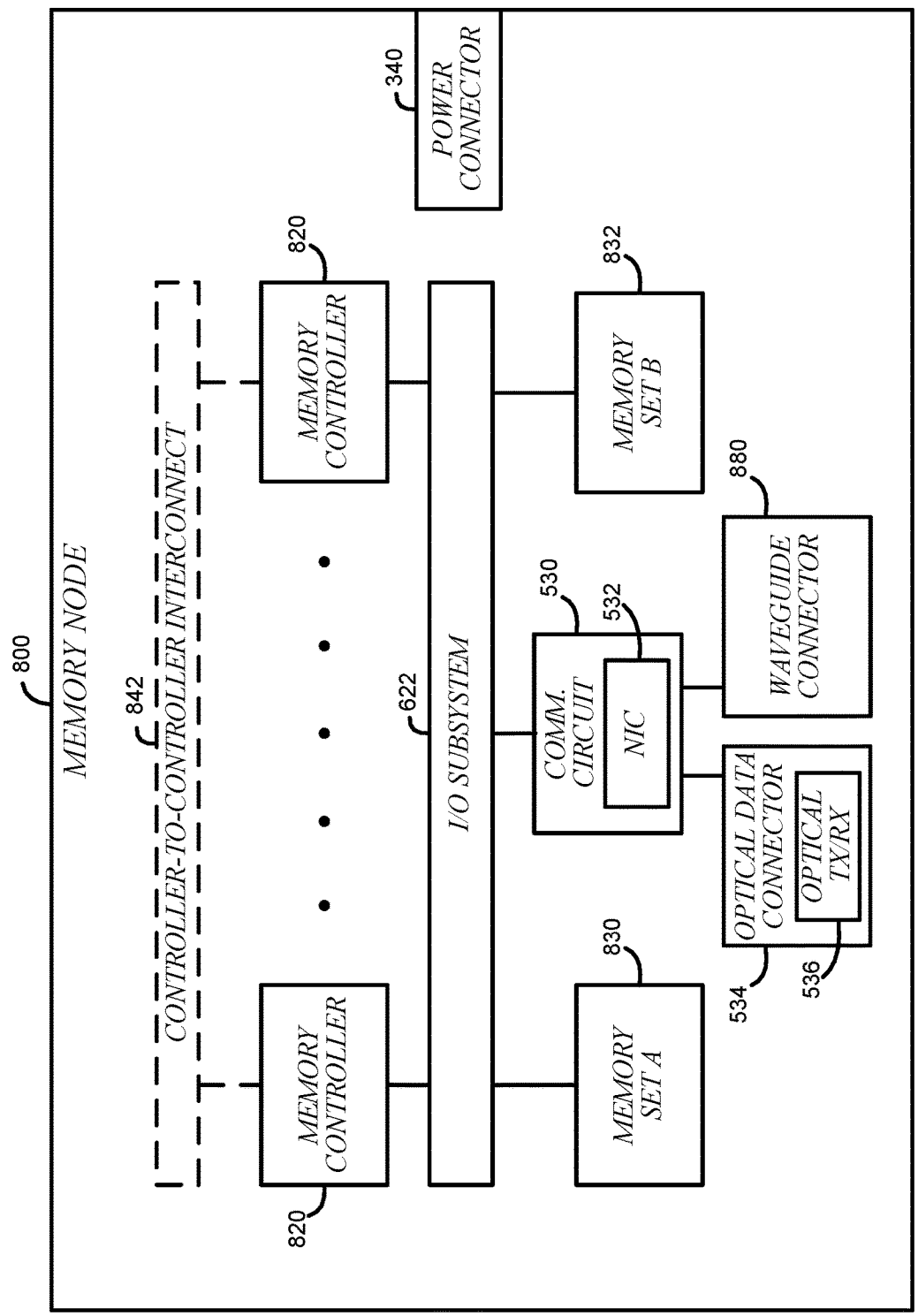
FIG. 8 is a simplified block diagram of at least one example of a memory node usable in a data center.

Referring now to FIG. 8, in some examples, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. Also, additional external memory sets can be facilitated using communication circuit 530 and memory sets on memory node(s) located in other physical nodes (not shown). For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other examples. The memory controllers 820 may be embodied as any type of processor, controller, or control circuit capable of controlling the writing and reading of data into the memory sets 830, 832 based on requests received via the communication circuit 530. In the illustrative example, memory controller 820 is connected to a corresponding memory set 830, 832 to write to and read from memory devices 420 within the corresponding memory set 830, 832 and enforce a permissions (e.g., read, write, etc.) associated with node 400 that has sent a request to the memory node 800 to perform a memory access operation (e.g., read or write).

In some examples, the memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. In the illustrative example, the controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect utilized for controller-to-controller communications. As such, in some examples, a memory controller 820 may access, through the controller-to-controller interconnect 842, memory that is within the memory set 832 associated with another memory controller 820. In some examples, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some examples, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may reduce the latency and bandwidth associated with performing memory access operations as compared to accessing contiguous memory addresses from the same memory device.

Further, in some examples, the memory node 800 may be connected to one or more other nodes 400 (e.g., in the same rack 240 or an adjacent rack 240) through a waveguide, using the waveguide connector 880. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
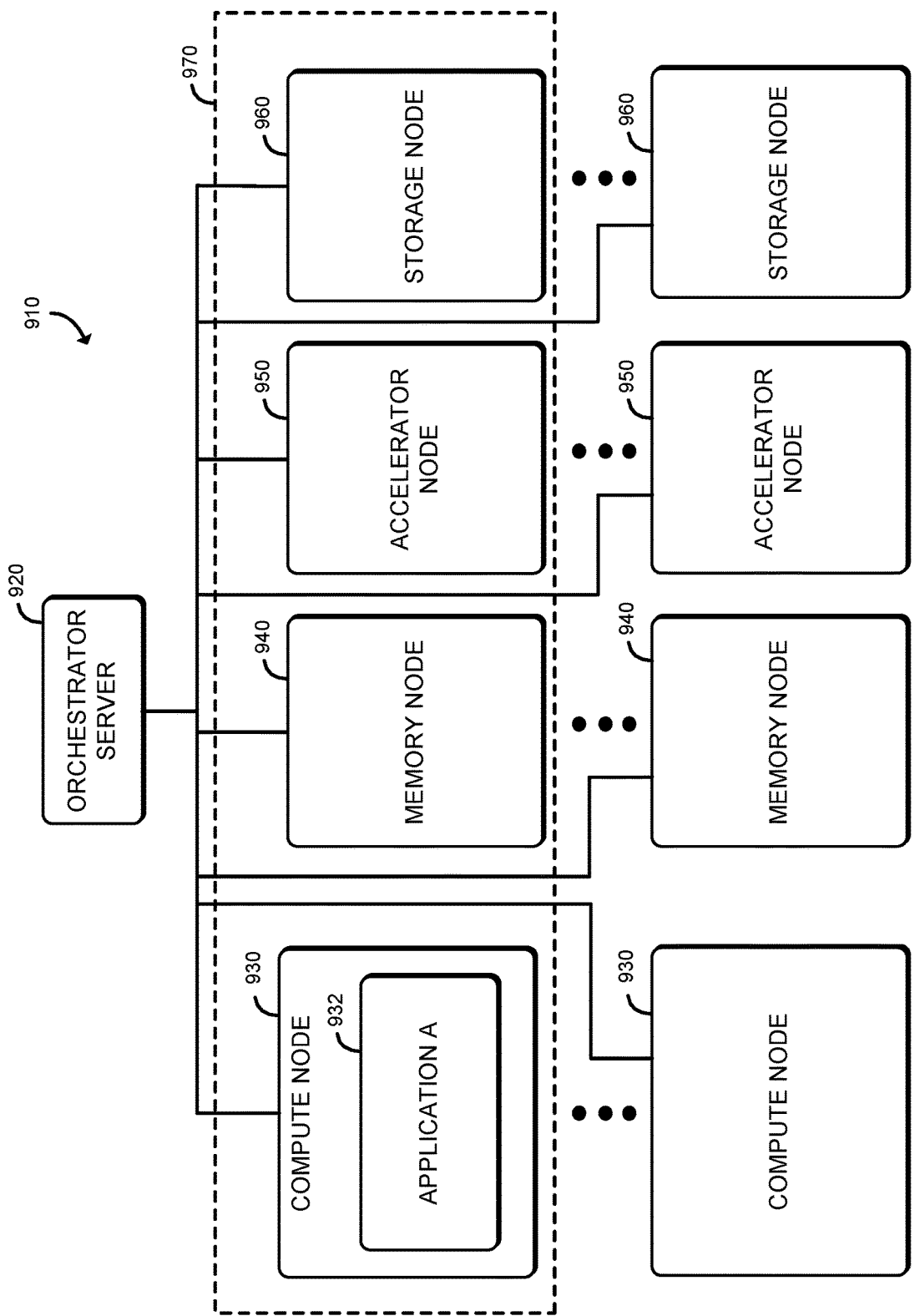
FIG. 9 depicts a system for executing one or more workloads.

Referring now to FIG. 9, a system for executing one or more workloads (e.g., applications or microservices) may be implemented. In the illustrative example, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., similar to the compute node 500), memory nodes 940 (e.g., similar to the memory node 800), accelerator nodes 950 (e.g., similar to the accelerator node 600), and storage nodes 960 (e.g., similar to the storage node 700). One or more of the nodes 930, 940, 950, 960 may be grouped into a managed node 970, such as by the orchestrator server 920, to collectively perform a workload (e.g., an application 932 executed in a virtual machine or in a container). While orchestrator node 920 is shown as a single entity, alternatively or additionally, its functionality can be distributed across multiple instances and physical locations.

The managed node 970 may be embodied as an assembly of physical resources 320, such as processors 520, memory resources 420, accelerator circuits 620, or data storage 750, from the same or different nodes 400. Further, the managed node may be established, defined, or "spun up" by the orchestrator server 920 at the time a workload is to be assigned to the managed node, and may exist regardless of whether a workload is presently assigned to the managed node. In the illustrative example, the orchestrator server 920 may selectively allocate and/or deallocate physical resources 320 from the nodes 400 and/or add or remove one or more nodes 400 from the managed node 970 as a function of quality of service (QoS) targets (e.g., a target throughput, a target latency, a target number instructions per second, etc.) associated with a service level agreement or class of service (COS or CLOS) for the workload (e.g., the application 932). In doing so, the orchestrator server 920 may receive telemetry data indicative of performance conditions (e.g., throughput, latency, instructions per second, etc.) in node 400 of the managed node 970 and compare the telemetry data to the quality-of-service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some examples, the orchestrator server 920 may identify trends in the resource utilization of the workload (e.g., the application 932), such as by identifying phases of execution (e.g., time periods in which different operations, having different resource utilizations characteristics, are performed) of the workload (e.g., the application 932) and pre-emptively identifying available resources in the data center and allocating them to the managed node 970 (e.g., within a predefined time period of the associated phase beginning). In some examples, the orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance, including optionally previously collected historical performance, of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with potential resource available in the data center 100 (e.g., the latency associated with the performance of the resource itself in addition to the latency associated with the path through the network between the compute node executing the workload and the node 400 on which the resource is located).

In some examples, the orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, in some examples, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads with others, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some examples, the orchestrator server 920 may identify patterns in resource utilization phases of the workloads and use the patterns to predict future resource utilization of the workloads.

To reduce the computational load on the orchestrator server 920 and the data transfer load on the network, in some examples, the orchestrator server 920 may send self-test information to the nodes 400 to enable node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Node 400 may then report back a simplified result (e.g., yes or no) to the orchestrator server 920, which the orchestrator server 920 may utilize in determining the allocation of resources to managed nodes.

Examples described herein can select a storage node 700 or memory node 800 to store data for access by node 400, node 500, or accelerator node 600 to reduce a transit time of data to meet applicable service level agreement (SLA) parameters. Nodes 400 to 800 can be used in a data center or disaggregated composite nodes. The techniques described herein can apply to both disaggregated and traditional server architectures. A traditional server can include a CPU, XPU, one or more memory devices, networking communicatively coupled to one or more circuit boards within a server.

Examples of Driver that Provides for Tenant Service Level Agreement (SLA) Policy Enforcement In some examples, a driver (e.g., a VF driver), when launched, advertises requested capabilities (e.g., remote direct memory access (RDMA), queues, crypto offload, and so forth) of a virtual execution environment (VEE) to a control plane. The control plane can access a service level agreement (SLA) applicable to the VEE from a controller. For example, a controller can include a software defined networking (SDN) controller, orchestrator, hypervisor, or other VEE manager. The controller can provision VEEs for execution on a compute node and manage related SLAs for the VEEs.

Based on the SLA applicable to the VEE, a service provider can limit hardware capabilities available to the VEE by limiting capabilities during negotiation between the VF driver and the control plane. In some examples, the control plane can limit capabilities of the VEE based on an applicable SLA by communicating the capabilities available to the VEE to the VF driver using a mailbox (e.g., side band queues). The control plane can configure the resources and capabilities that match with the tenant SLA in the applicable hardware device(s) and/or the VF driver. To limit capabilities of the VEE provided to the device, the control plane can utilize access control lists (ACLs) to block messages or descriptors sent to the device are not permitted for use by the VEE (e.g., mark as malicious). Accordingly, the VF driver can customize and limit resource allocation to a VEE based on its SLA instead of providing the VEE with access to full use of hardware resources. In some cases, the VF driver can provide a same level of access to hardware resources to VEEs that utilize the VF driver regardless of whether the VEEs are permitted to have a same level of access to hardware resources.

In some examples, instead of different drivers for different devices being utilized by a VEE, a single VF driver can negotiate multiple "T-shirt sizes" or device capabilities based on capabilities provided by the control plane and provide the VEE with access to such device capabilities. In some examples, multiple VF drivers can be utilized by a VEE to negotiate capabilities with multiple devices.

Figure 10A:
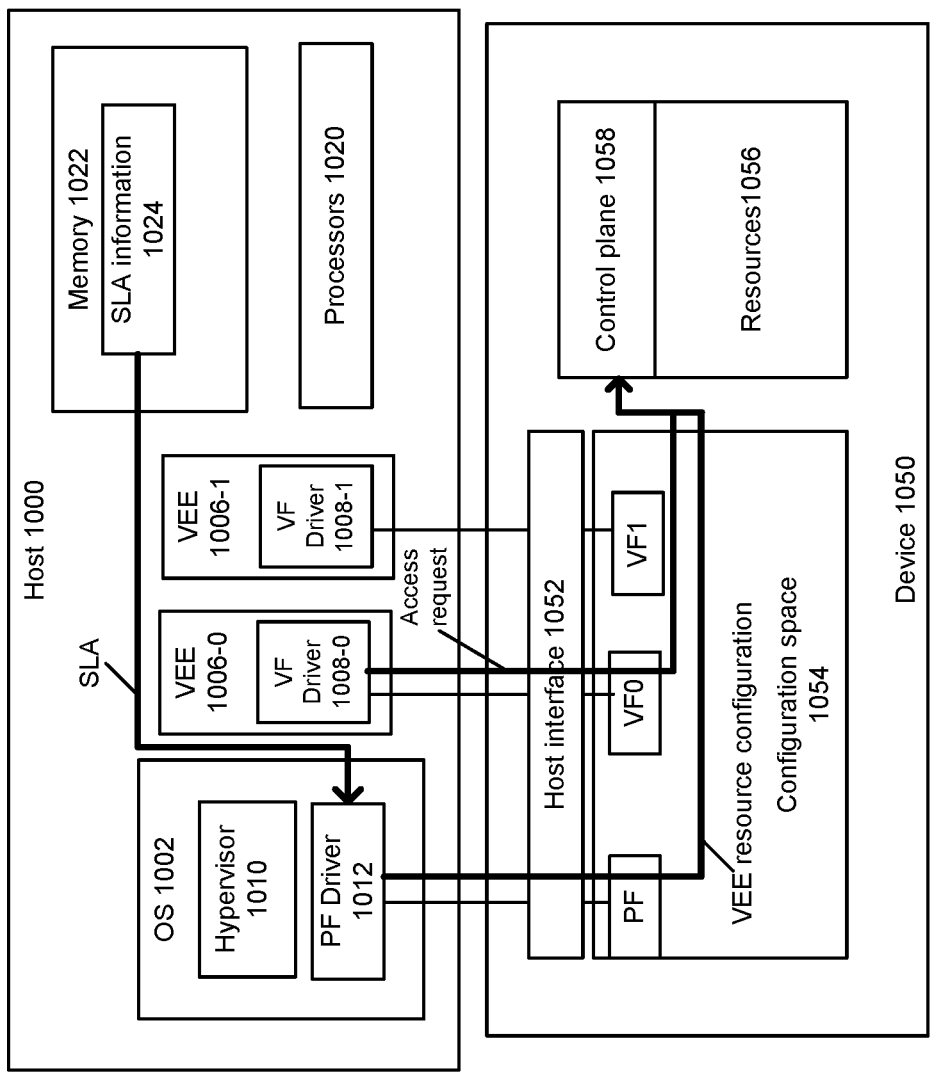
FIGS. 10A and 10B depict example systems.

FIG. 10A depicts an example system. In this example, configuration of capabilities available to a VEE is made by a host. In some examples, VEE 1006-0 or 1006-1 can utilize respective VF driver 1008-0 or 1008-1 that negotiates with control plane 1082 to set capabilities of resources 1056 available to VEE 1006-0 or 1006-1.

Host system 1000 can include or use various processors 1020 and memory 1022 in connection with configuring capabilities of resources 1056 available to the VEE. Processors 1020 can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Processors 1020 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein.

Physical Functions (PFs) can be PCIe functions that are discovered, managed, and manipulated as a PCIe device. Through use of PF driver 1012, PCIe connected device (e.g., device 1050) can be configured or controlled, and the PF can copy data into and out of the PCIe connected device. A PF is independent and handled by software as a separate PCI Express device. Virtual Functions (VFs) are PCIe functions that are permitted to copy data in and out of a PCIe device. A VF is attached to an underlying PF and a PF can have from zero (0) to one (1) or more VFs. In addition, PFs within the same device can have a different number of VFs. Note that a destination entity can be a PF or VF or any type of processor-executed software, device, or peripheral device (e.g., storage controller, GPU, accelerator, and so forth) that processes an interrupt vector or interrupt message. A subordinate or secondary destination entity can be a VF associated with a PF, or a peripheral device in some examples.

Some examples use either or both of Single Root I/O Virtualization (SR-IOV) or Intel® Scalable I/O Virtualization Technical Specification (S-IOV). A SR-IOV extension enables multiple virtualized execution environments (e.g., system images) to share PCIe hardware resources under a single-node system (e.g., single root complex). SR-IOV is compatible at least with specifications available from Peripheral Component Interconnect Special Interest Group (PCI SIG) including specifications such as Single Root I/O Virtualization and Sharing specification Revision 1.1 (2010)

and variations thereof and updates thereto. A SR-IOV device provides a bus device function (BDF) identifier for a virtual function within a PCIe hierarchy; a unique memory address space for a virtual function (VF) within a PCIe hierarchy; a unique error logging and escalation scheme; a unique MSI/MSI-X capability for a VF within a PCIe hierarchy; and power-management capabilities for a VF within a PCIe hierarchy. In addition, SR-IOV provides the capability to discover and configure virtualization capabilities which include a number of VFs that the PCIe device will associate with a device and the type of base address register (BAR) mechanism supported by the VFs.

S-IOV is a PCIe-based virtualization technique that provides for scalable sharing across virtualized execution environments of I/O devices, such as network controllers, storage controllers, graphics processing units, and other hardware accelerators across a large number of virtualized execution environments. A technical specification for S-IOV is Intel® Scalable I/O Virtualization Technical Specification, revision 1.0 and variations thereof and updates thereto. A SIOV capable device can be configured to group its resources into multiple isolated Assignable Device Interfaces (ADIs). Direct Memory Access (DMA) data transfers from/to an ADI are tagged with a unique Process Address Space identifier (PASID) number. Unlike the coarse-grained device partitioning approach of SR-IOV to create multiple VFs on a PF, S-IOV enables software to flexibly compose virtual devices utilizing the hardware-assists for device sharing at finer granularity. Performance critical operations on the composed virtual device are mapped directly to the underlying device hardware, while non-critical operations are emulated through device-specific composition software in the host.

Note that FIG. 10A shows a hosted implementation where hypervisor 1010 runs on a host operating system (OS) and uses the host OS or drivers to access device 1050. In a bare metal implementation, hypervisor 1010 installs directly onto host 1000 and there is no OS and the hypervisor has direct access to all hardware and features. Bare metal is most often used for servers because of their security and portability to move from hardware to hardware.

Operating system (OS) 1002 can execute on one or more of processors 1020. Hypervisor 1010 can be a virtual machine manager (VMM) or system software and can launch and manage virtual VEEs 1006-0 and 1006-1 as well as VF drivers 1008-0 and 1008-1. Although one PF and two VFs are shown in this example, multiple PFs and fewer or more VFs could be used. A PF can have more one or more associated VFs. In some examples, a separate PF driver (not shown) can be used that is to act as the synchronization point for vector allocations with no data plane operations.

VF drivers 1008-0 and 1008-1 can be consistent with one or more of: VMware environment VMXNET3, Non-volatile memory express (NVMe), Linux environments using virtio devices (e.g., virtio-net, virtio-blk, virtio-scsi), Microsoft® NetVSC, Google virtual NIC (gVNIC), Amazon® Elastic Network Adapter, or others. In some examples, VF drivers 1008-0 and 1008-1 can access a region of memory that is written to or read from by respective VEEs 1006-0 and 1006-1 as though the region of memory is a device.

Device 1050 can use interface 1052 to communicate with host 1000. In some examples, interface 1052 is compliant with PCIe or CXL, although any other interface could be used. Device 1050 can include one or more of: CPU, GPU, memory device, storage device, an accelerator (e.g., FPGA), a cryptographic accelerator device, network interface device, infrastructure processing unit (IPU), data processing unit (DPU), smartNIC, fabric interface, or other devices. Resources 1056 of device 1050 can include circuitry and capabilities, some or none of which, are available for utilization by VEE 1006-0 or 1006-1, as described herein.

In some examples, PF driver 1012 can be configured by hypervisor 1010 as an SDN controller agent on host 1000 and can configure control plane 1058 with SLA information 1024 for one or more of VEEs 1006-0 and 1006-1. A described herein, one or more of VF driver 1008-0 and 1008-1 can determine an extent of resources 1056 available for use by respective VEE 1006-0 or 1006-1 by negotiation with control plane 1058. SLA information 1024 for one or more of VEEs 1006-0 and 1006-1 can be stored in memory 1022 of host 1022. For example, SLA information 1024 can indicate whether a VEE is permitted to request use of device features of resources 1056 including one or more of: checksum performance offload to a device, packet segmentation offload performance to a device, use of multiple cores to process traffic using multiple queues, receive side scaling (RSS) input set determination at a device, header split offset performance at a device, receive (RX) descriptor formats supported by the VEE, transmit (TX) descriptors supported by the VEE, Receive Side Coalescing performance offload to a device, remote direct memory access (RDMA) performance by a device, cryptographic operations performance by a device, multi channel support by a device, number of interrupt vectors supported by a device, number of virtual ports (vports) supported by a device, queues per vport supported by a device, etc.

For example, based on an SLA applicable to VEE 1006-0, control plane 1058 can determine an extent of capabilities available to perform work provided through VF driver 1008-0. Control plane 1058 can indicate to VF driver 1008-0 capabilities available to perform work and VF driver 1008-0 can provide work requests to device 1050 up to the extent of hardware capabilities available to VEE 1006-0. Control plane 1058 can be implemented as firmware executed by device 1050, in some examples. Capability negotiation and limiting can take place for VEE 1006-1 in a similar manner as that used for VEE 1006-0.

In some examples, in addition, or alternatively, control plane 1058 can limit or not limit capabilities when performing work for a VEE 1006-0 or 1006-1. Control plane 1058 can utilize an access control list (ACL) that, based on receipt of a request to perform more than permitted capability for a particular VEE, performs one or more of: triggers a fault to indicate that excessive capabilities were requested, denies the request, downscales the request to be within the permitted utilization of resources 1056, or other operations. Note that although one device is shown, configuration of capabilities available for use in multiple devices can be configured by VF driver 1008-0 or 1008-1.

Configuration space 1054 can include a set of registers. On PCIe buses, configuration space 1054 may be referred to as Extended Configuration Space. Configuration space can be mapped to a memory space of the CPU (e.g., using Enhanced Configuration Access Mechanism (ECAM)).

Figure 10B:
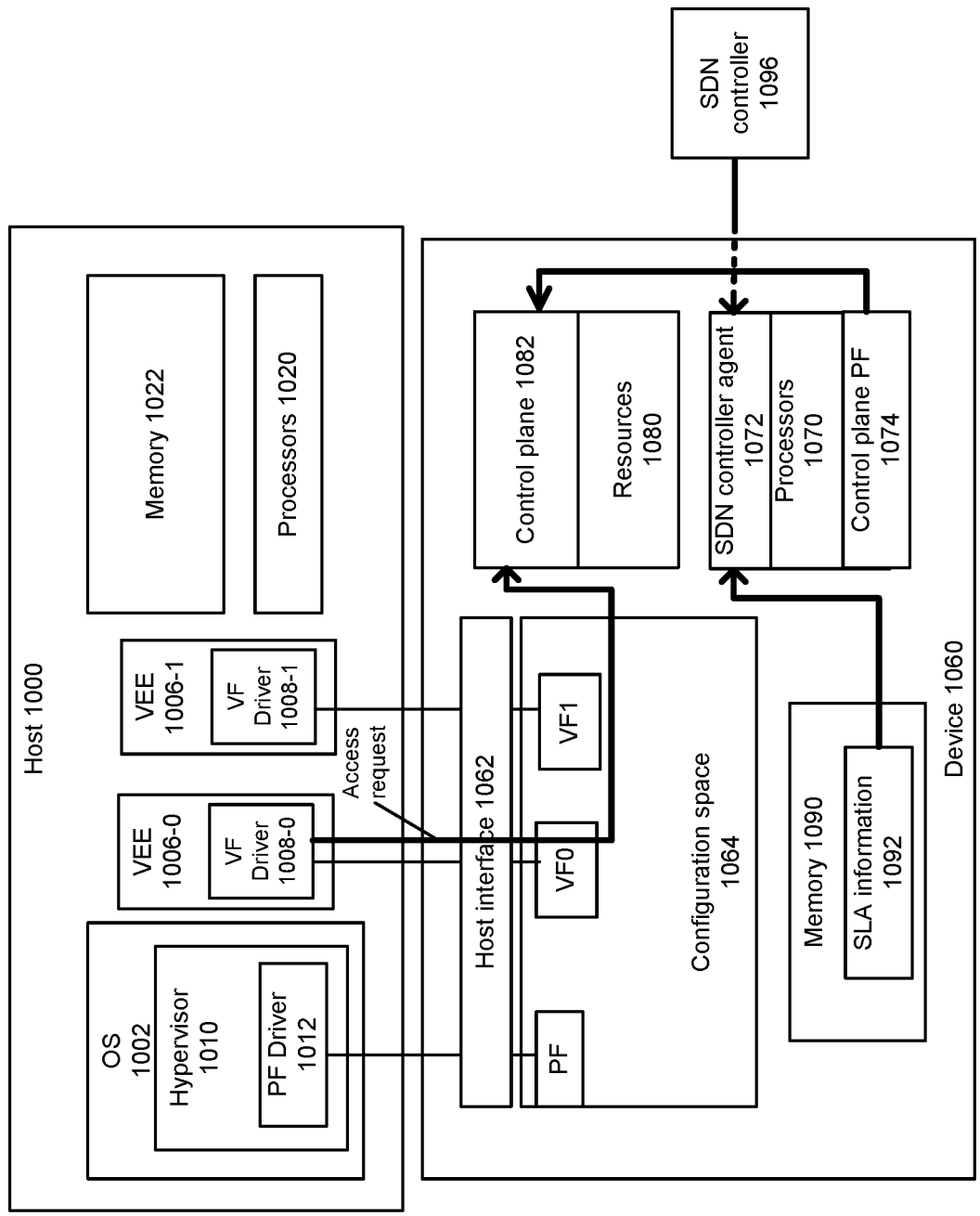

FIG. 10B depicts an example system. In this example, configuration of hardware capabilities available to a VEE is made by processors on device instead of the host. In some examples, configuration of hardware capabilities available to a VEE can be made by a combination of device and host. Via a network, SDN controller 1096 can configure device 1060 with SLA information 1092 of one or more of VEEs 1006-0 and 1006-1. SDN controller agent 1072, executed by processors 1070 on device 1060, can access SLA information 1092 stored in memory 1090 of device 1060 to configure control plane 1082 with capabilities available to one or more of VEEs 1006-0 and 1006-1. In some examples, one or more of VF driver 1008-0 and 1008-1 can determine an extent of resources 1080 available for use by respective VEE 1006-0 or 1006-1 by negotiation with control plane 1082 and limit work requests provided by a VEE to device 1060 up to the extent of hardware capabilities available to the VEE. In addition, or alternatively, in a similar manner as that of control plane 1058, control plane 1082 can control or limit access to resources 1080 made by VEEs 1006-0 and 1006-1.

Figure 11:
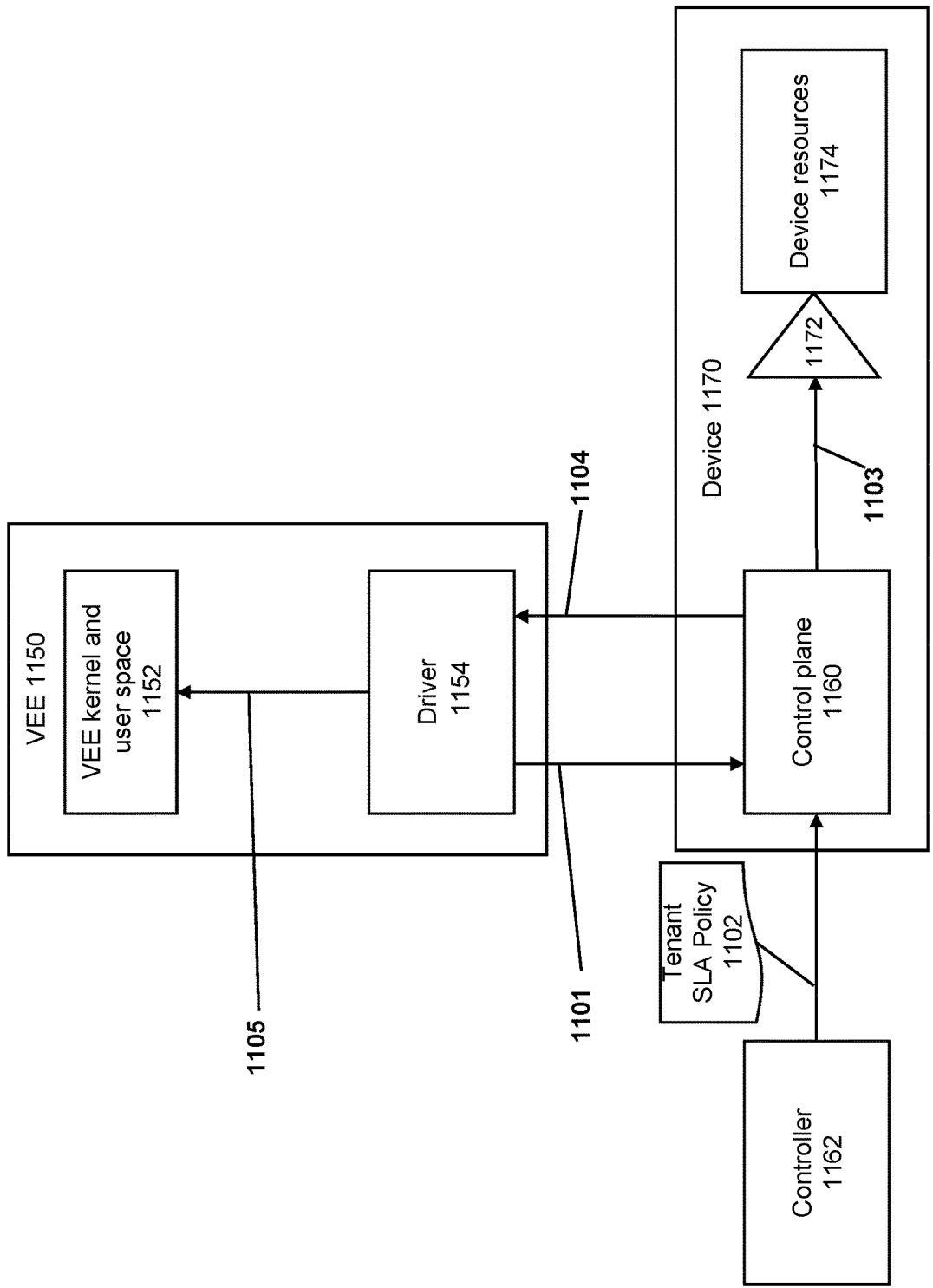
FIG. 11 depicts an example manner of configuring a system to perform capability negotiation using a driver and a control plane.

FIG. 11 depicts an example manner of configuring a system to perform capability negotiation using a driver and a control plane. At least two VEEs can utilize an instance of the same driver but receive different hardware capabilities or resources according to their SLAs. VF driver 1154 can be a driver capable of supporting access to different devices for different offload features, scale of resources etcetera that any device can support. VF driver 1154 can advertise capabilities of VEE 1150 and request usage of device resources 1174 from control plane 1160. For example, when VEE 1150 initializes or boots, driver 1154 can announce those capabilities to controller 1162 (e.g., SDN controller agent). In some examples, at boot, VEE 1150 has access to a mailbox to communicate with controller 1162. In some examples, controller 1160 can be executed in a same or different server than that of VEE 1150.

Controller 1162 can provide an interface for a data center administrator to provide per-Tenant SLA based policy information per physical function (PF). SLA capabilities can identify whether VEE 1150 is permitted to request usage of resources described herein. At 1102, controller 1160 can access an SLA database of a profile to enforce per VEE and provide the SLA profile to control plane 1160. In some examples, control plane 1160 can be firmware executed by device 1170 and device 1170 has device resources 1174 available for usage by a VEE.

At 1103, control plane 1160 can validate the requested capabilities in 1101 against the tenant SLA for VEE 1150. When control plane 1160 receives a capabilities announcement from VEE 1150, control plane 1160 checks the SLA policy and restricts VEE 1150 and driver 1154 to capabilities and resources up to or less than those specified in the SLA. Control plane 1160 can exercise the policy governed by a Tenant SLA for a given VEE to prevent the VEE from accessing features and resources in excess of those permitted under an applicable SLA. Control plane 1160 can set appropriate hardware and software ACLs in resource gate 1172 to limit utilization of device resources 1174 by VEE 1150 by configuring resource gate 1172 to block messages that request resources in excess of resources permitted to be allocated to VEE 1150. In some examples, control plane 1160 can set appropriate hardware and software ACLs so that a malicious VEE that tries to access a capability of device resources 1174 is blocked.

At 1104, control plane 1160 can provide capabilities and resource information that match the tenant SLA (or lower tier but closest available resources) to driver 1154. For example, if devices resources 1174 do not provide transmit bandwidth or RSS queues as specified under an SLA for VEE 1150, a lower transmit bandwidth or lower number of RSS queues can be made available to VEE 1150. Control plane 1160 can configure driver 1154 with resources and capabilities for VEE 1150 that match the tenant SLA available in device resources 1174.

At 1105, driver 1154 can expose capabilities supported by driver 1154 to the kernel/user space layer 1152 of VEE 1150 for access by a kernel and/or user space application, process, microservice, and so forth. Driver 1154 can indicate the available subset of device resources 1174 to OS and user application of VEE kernel and user space 1152.

Figure 12:
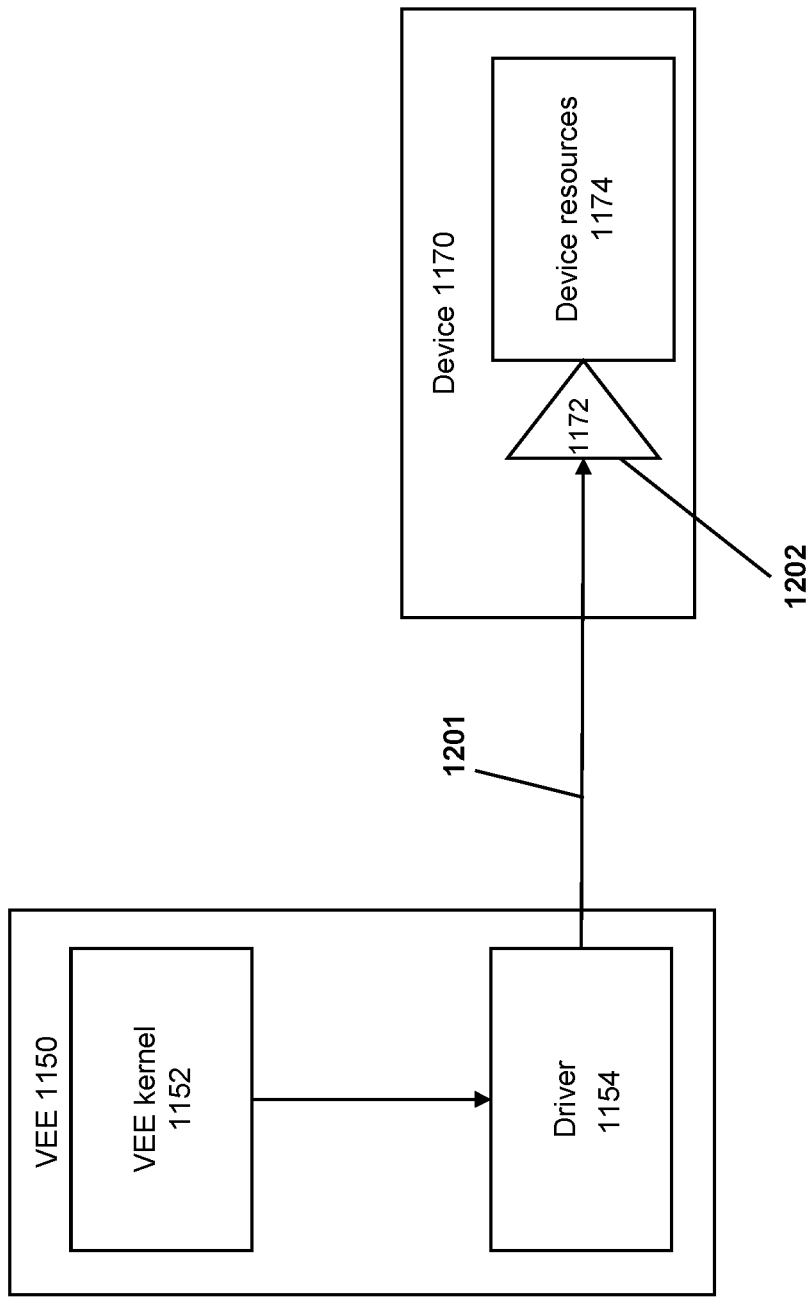
FIG. 12 depicts an example of issuance of resource utilization requests.

FIG. 12 depicts an example of issuance of resource utilization requests. At 1201, VEE 1150 can utilize capabilities and resources granted by control plane 1160 when communicating with device 1170. VEE 1150 can limit requests to capabilities and resources granted by control plane 1160. At 1202, if VEE 1150 attempts to use capabilities of resource 1174 that were not granted by control plane 1160, the capability request could be blocked by gate 1172 and a malicious driver detection error generated and the control plane software could be informed.

For example, if device 1170 can support RDMA and crypto offload, VEE 1150 can receive access to these features if its SLA permits access to those features. However, using some examples herein, control plane 1160 enforces resource utilization by VEE 1150 based on the applicable tenant SLA and if the SLA does not permit access to RDMA and crypto offload, RDMA and crypto are not available for use by VEE 1150 because messages to utilize RDMA or crypto offload are blocked from being received by the device by gate 1172 or driver 1154 does not send requests to gate 1172 to utilize RDMA or crypto features of device 1170.

Figure 13A:
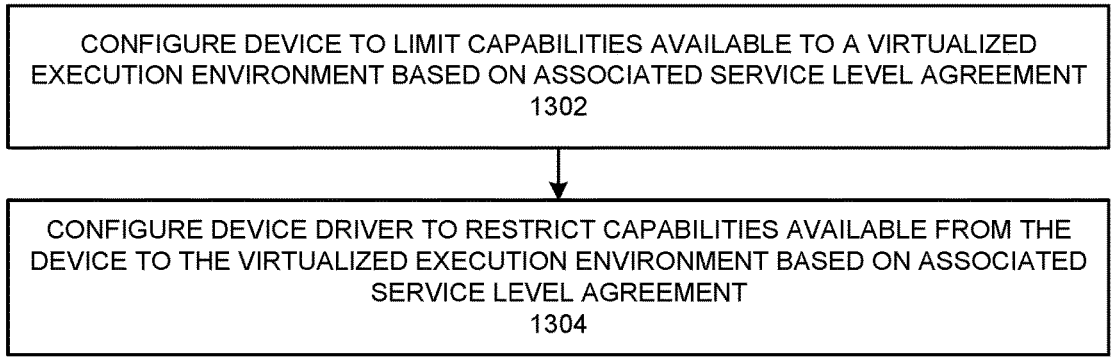
FIGS. 13A and 13B depict example processes.

FIG. 13A depicts an example process to configure a system to provide access to device capabilities to a virtualized execution environment. At 1302, a device can be configured with capabilities available to a virtualized execution environment. For example, an SLA associated with the virtualized execution environment can be received from an SDN controller and stored in the device or a host. In some examples, the device can include a control plane that is configured to enforce usage of the device capabilities according to an SLA of a requester virtualized execution environment.

At 1304, in some examples, a device driver for the virtualized execution environment can be configured to limit requests from the virtualized execution environment to utilize device capabilities based on the applicable SLA. For example, a control plane of the device can configure the device driver to limit requests from the virtualized execution environment to utilize device capabilities based on the applicable SLA.

Figure 13B:
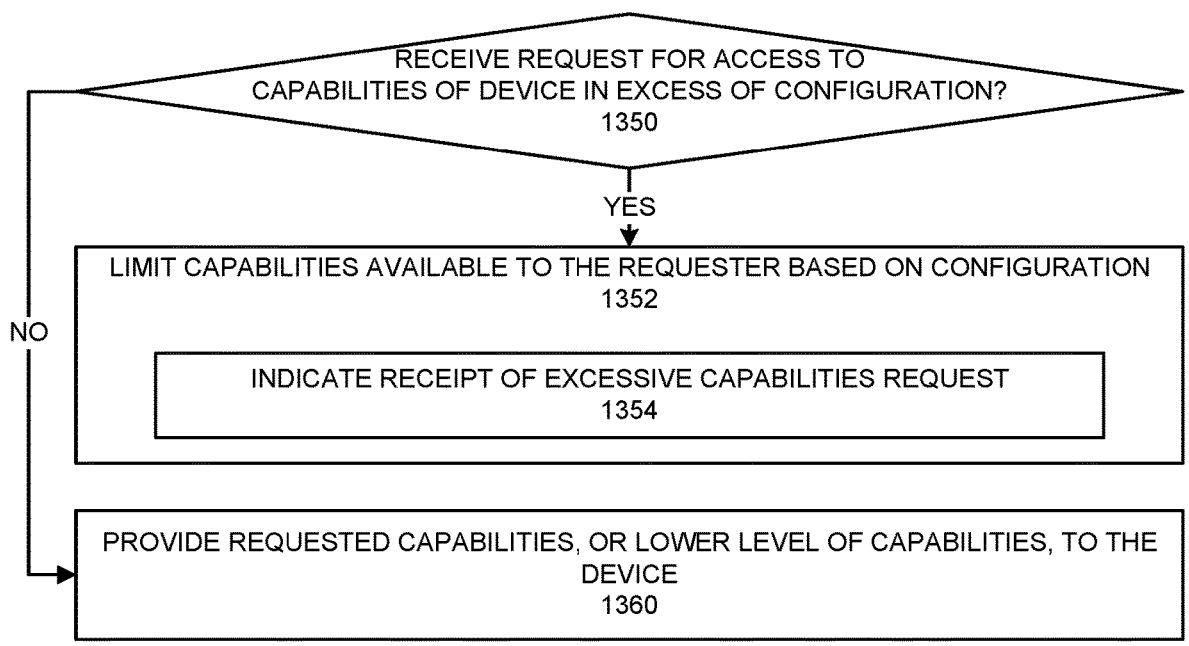

FIG. 13B depicts an example process to utilize resources of a device. At 1350, a determination can be made if a request is received that requests device usage in excess of configured device usage capabilities for a requester virtualized execution environment. If the request exceeds the configured device usage capabilities for the requester virtualized execution environment, the process can continue to 1352. However, if the request is within or less than the configured device usage capabilities for a virtualized execution environment, the process can continue to 1360, where the request is provided to the device to utilize the requested capabilities.

At 1352, the capabilities available for use by the virtualized execution environment can be limited to those configured for use. However, in some examples, the request can be denied and no resource usage may be possible. In some examples, at 1354, an error message can be indicated to an SDN controller agent and/or SDN controller to indicate a request for excessive capability usage and identify the virtualized execution environment that requested the excessive capability.

Figure 14:
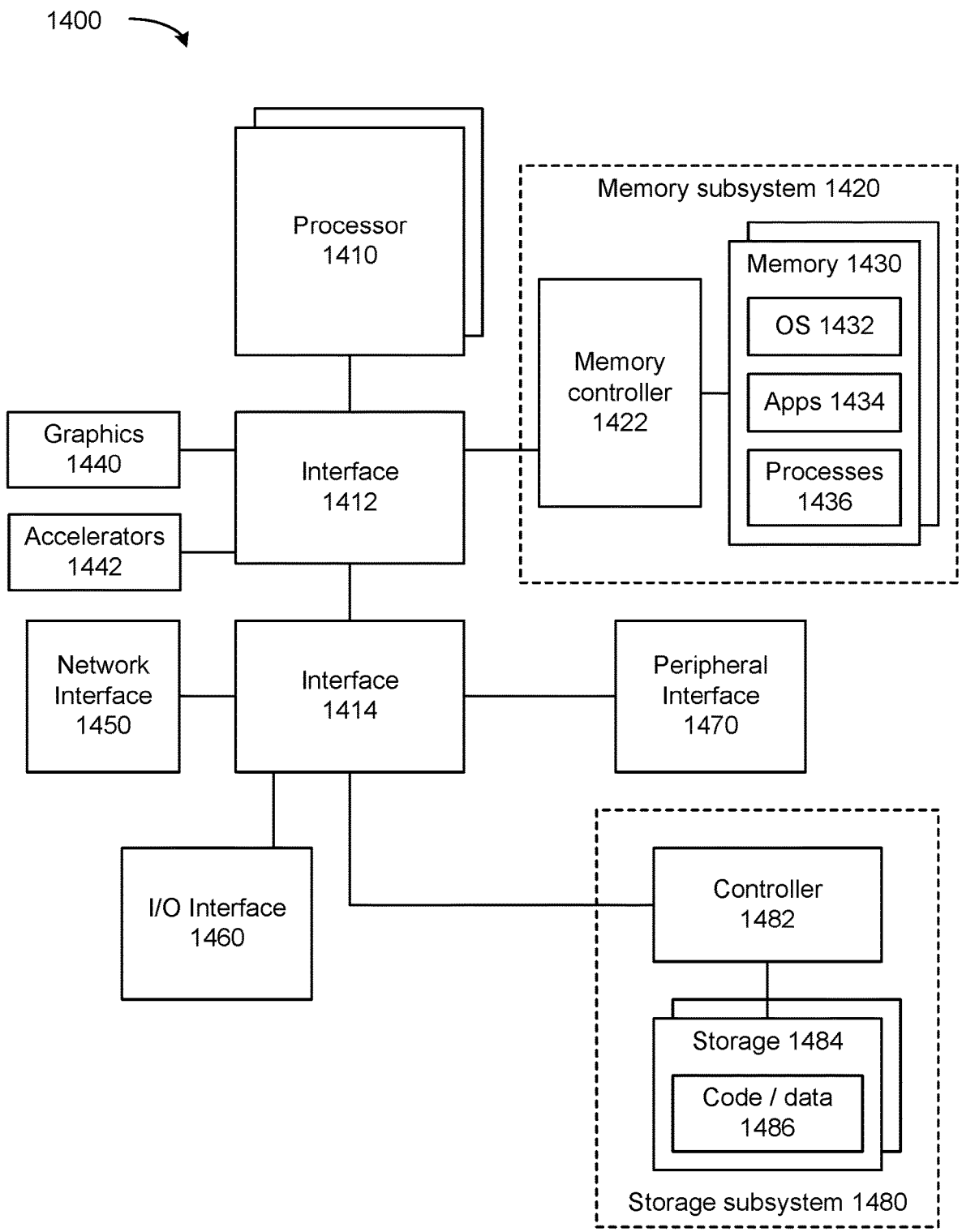
FIG. 14 depicts an example computing system.

FIG. 14 depicts an example computing system. Various examples can use limit a VEE from accessing certain capabilities of components of system 1400 (e.g., processor 1410, network interface 1450, and so forth) by a device driver and control plane, as described herein. System 1400 includes processor 1410, which provides processing, operation management, and execution of instructions for system 1400. Processor 1410 can include any type of microprocessor, central processing unit (CPU), graphics processing unit (GPU), processing core, or other processing hardware to provide processing for system 1400, or a combination of processors. Processor 1410 controls the overall operation of system 1400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1400 includes interface 1412 coupled to processor 1410, which can represent a higher speed interface or a high throughput interface for system components that needs higher bandwidth connections, such as memory subsystem 1420 or graphics interface components 1440, or accelerators 1442. Interface 1412 represents an interface circuit, which can be a standalone component or integrated onto a processor die. Where present, graphics interface 1440 interfaces to graphics components for providing a visual display to a user of system 1400. In one example, graphics interface 1440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1440 generates a display based on data stored in memory 1430 or based on operations executed by processor 1410 or both. In one example, graphics interface 1440 generates a display based on data stored in memory 1430 or based on operations executed by processor 1410 or both.

Accelerators 1442 can be a fixed function or programmable offload engine that can be accessed or used by a processor 1410. For example, an accelerator among accelerators 1442 can provide compression (DC) capability, cryptography services such as public key encryption (PKE), cipher, hash/authentication capabilities, decryption, or other capabilities or services. In some examples, in addition or alternatively, an accelerator among accelerators 1442 provides field select controller capabilities as described herein. In some cases, accelerators 1442 can be integrated into a CPU socket (e.g., a connector to a motherboard or circuit board that includes a CPU and provides an electrical interface with the CPU). For example, accelerators 1442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1442 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1420 represents the main memory of system 1400 and provides storage for code to be executed by processor 1410, or data values to be used in executing a routine. Memory subsystem 1420 can include one or more memory devices 1430 such as read-only memory (ROM), flash memory, one or more varieties of random access memory (RAM) such as DRAM, or other memory devices, or a combination of such devices. Memory 1430 stores and hosts, among other things, operating system (OS) 1432 to provide a software platform for execution of instructions in system 1400. Additionally, applications 1434 can execute on the software platform of OS 1432 from memory 1430. Applications 1434 represent programs that have their own operational logic to perform execution of one or more functions. Processes 1436 represent agents or routines that provide auxiliary functions to OS 1432 or one or more applications 1434 or a combination. OS 1432, applications 1434, and processes 1436 provide software logic to provide functions for system 1400. In one example, memory subsystem 1420 includes memory controller 1422, which is a memory controller to generate and issue commands to memory 1430. It will be understood that memory controller 1422 could be a physical part of processor 1410 or a physical part of interface 1412. For example, memory controller 1422 can be an integrated memory controller, integrated onto a circuit with processor 1410.

In some examples, OS 1432 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. Various examples of drivers used to negotiate and limit capabilities available to a VEE are described herein. A driver executed by a processor can configure devices of system 1400 to be configured to limit or not permit performance of requests from a VEE that are not permitted by a control plane. A driver executed by a processor can be configured to not issue requests from a VEE to a device that are not permitted by a control plane.

While not specifically illustrated, it will be understood that system 1400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1400 includes interface 1414, which can be coupled to interface 1412. In one example, interface 1414 represents an interface circuit, which can include standalone components and integrated circuitry. In one example, multiple user interface components or peripheral components, or both, couple to interface 1414. Network interface 1450 provides system 1400 the ability to communicate with remote devices (e.g., servers or other computing devices) over one or more networks. Network interface 1450 can include an Ethernet adapter, wireless interconnection components, cellular network interconnection components, USB (universal serial bus), or other wired or wireless standards-based or proprietary interfaces. Network interface 1450 can transmit data to a device that is in the same data center or rack or a remote device, which can include sending data stored in memory. Network interface 1450 can receive data from a remote device, which can include storing received data into memory. Various examples of network interface 1450 can determine whether to migrate data to another memory device and select another memory device, as described herein.

Some examples of network interface 1450 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1400 includes one or more input/output (I/O) interface(s) 1460. I/O interface 1460 can include one or more interface components through which a user interacts with system 1400 (e.g., audio, alphanumeric, tactile/touch, or other interfacing). Peripheral interface 1470 can include any hardware interface not specifically mentioned above. Peripherals refer generally to devices that connect dependently to system 1400. A dependent connection is one where system 1400 provides the software platform or hardware platform or both on which operation executes, and with which a user interacts.

In one example, system 1400 includes storage subsystem 1480 to store data in a nonvolatile manner. In one example, in certain system implementations, at least certain components of storage 1480 can overlap with components of memory subsystem 1420. Storage subsystem 1480 includes storage device(s) 1484, which can be or include any conventional medium for storing large amounts of data in a nonvolatile manner, such as one or more magnetic, solid state, or optical based disks, or a combination. Storage 1484 holds code or instructions and data 1486 in a persistent state (e.g., the value is retained despite interruption of power to system 1400). Storage 1484 can be generically considered to be a "memory," although memory 1430 is typically the executing or operating memory to provide instructions to processor 1410. Whereas storage 1484 is nonvolatile, memory 1430 can include volatile memory (e.g., the value or state of the data is indeterminate if power is interrupted to system 1400). In one example, storage subsystem 1480 includes controller 1482 to interface with storage 1484. In one example controller 1482 is a physical part of interface 1414 or processor 1410 or can include circuits or logic in both processor 1410 and interface 1414.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one example, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1400. More specifically, power source typically interfaces to one or multiple power supplies in system 1400 to provide power to the components of system 1400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1400 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be written to or read from virtualized storage nodes or memory pools using a protocol such as NVMe over Fabrics (NVMe-oF) or NVMe.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or examples. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.'"

Illustrative examples of the devices, systems, and methods disclosed herein are provided below. An example of the devices, systems, and methods may include one or more, and combination of, the examples described below.

Example 1 includes one or more examples and includes a computer-readable medium comprising instructions stored thereon that if executed, cause on or more processors to: execute a driver that is to: negotiate capabilities of hardware with a control plane available to a virtualized execution environment and provide access, by the virtualized execution environment, to fewer capabilities of the hardware than capabilities available from the hardware based on a service level agreement (SLA) associated with the virtualized execution environment.

Example 2 includes one or more examples, wherein the driver advertises requested capabilities of the virtualized execution environment.

Example 3 includes one or more examples, wherein the control plane sets available capabilities based on the SLA.

Example 4 includes one or more examples, wherein the control plane applies one or more access control lists (ACLs) to limit hardware capabilities usable by the virtualized execution environment.

Example 5 includes one or more examples, wherein the hardware capabilities comprise one or more of: checksum performance offload to a device, packet segmentation offload performance to the device, use of multiple cores to process traffic using multiple queues, receive side scaling (RSS) input set determination at the device, header split offset performance at the device, receive (RX) descriptor formats supported by the virtualized execution environment, transmit (TX) descriptors supported by the virtualized execution environment, Receive Side Coalescing performance offload to the device, remote direct memory access (RDMA) performance by a device, cryptographic operations performance by the device, multi-channel support by the device, number of interrupt vectors supported by the device, number of virtual ports (vports) supported by a device, or queues per vport supported by the device.

Example 6 includes one or more examples, wherein the hardware comprises one or more of: a central processing unit (CPU), graphics processing unit (GPU), memory device, storage device, storage controller, accelerator, a cryptographic accelerator device, network interface device, infrastructure processing unit (IPU), data processing unit (DPU), smartNIC, or fabric interface.

Example 7 includes one or more examples, and includes a method comprising: at a virtual device driver: negotiating capabilities of a hardware available to a virtualized execution environment and limiting capabilities of the hardware available to the virtualized execution environment based on a service level agreement (SLA) associated with the virtualized execution environment.

Example 8 includes one or more examples, wherein the virtual device driver advertises hardware capabilities requested by the virtualized execution environment.

Example 9 includes one or more examples, wherein a control plane sets capabilities of a hardware available to a virtualized execution environment based on the SLA.

Example 10 includes one or more examples, wherein a control plane applies one or more access control lists (ACLs) to limit hardware capabilities usable by the virtualized execution environment.

Example 11 includes one or more examples, wherein the hardware capabilities comprise one or more of: checksum performance offload to a device, packet segmentation offload performance to the device, use of multiple cores to process traffic using multiple queues, receive side scaling (RSS) input set determination at the device, header split offset performance at the device, receive (RX) descriptor formats supported by the virtualized execution environment, transmit (TX) descriptors supported by the virtualized execution environment, Receive Side Coalescing performance offload to the device, remote direct memory access (RDMA) performance by a device, cryptographic operations performance by the device, multi-channel support by the device, number of interrupt vectors supported by the device, number of virtual ports (vports) supported by a device, or queues per vport supported by the device.

Example 12 includes one or more examples, wherein the hardware comprises one or more of: a central processing unit (CPU), graphics processing unit (GPU), memory device, storage device, storage controller, accelerator, a cryptographic accelerator device, network interface device, infrastructure processing unit (IPU), data processing unit (DPU), smartNIC, or fabric interface.

Example 13 includes one or more examples, and includes an apparatus comprising: one or more processors, when operational, to execute instructions stored in memory device, to cause performance of: execute a driver that is to: negotiate capabilities of hardware with a control plane for a virtualized execution environment and limit capabilities of the hardware available to the virtualized execution environment based on a service level agreement (SLA) associated with the virtualized execution environment.

Example 14 includes one or more examples, wherein the driver is to advertise hardware capabilities requested by the virtualized execution environment.

Example 15 includes one or more examples, wherein the control plane is to set capabilities of a hardware available to the virtualized execution environment based on the SLA.

Example 16 includes one or more examples, wherein the control plane is to apply one or more access control lists (ACLs) to limit hardware capabilities usable by the virtualized execution environment.

Example 17 includes one or more examples, wherein the hardware capabilities comprise one or more of: checksum performance offload to a device, packet segmentation offload performance to the device, use of multiple cores to process traffic using multiple queues, receive side scaling (RSS) input set determination at the device, header split offset performance at the device, receive (RX) descriptor formats supported by the virtualized execution environment, transmit (TX) descriptors supported by the virtualized execution environment, Receive Side Coalescing performance offload to the device, remote direct memory access (RDMA) performance by a device, cryptographic operations performance by the device, multi-channel support by the device, number of interrupt vectors supported by the device, number of virtual ports (vports) supported by a device, or queues per vport supported by the device.

Example 18 includes one or more examples, wherein the hardware comprises one or more of: a central processing unit (CPU), graphics processing unit (GPU), memory device, storage device, storage controller, accelerator, a cryptographic accelerator device, network interface device, infrastructure processing unit (IPU), data processing unit (DPU), smartNIC, or fabric interface.

Example 19 includes one or more examples, and includes a server coupled to the hardware, wherein the server is to execute the virtualized execution environment.

Example 20 includes one or more examples, and includes a data center coupled to the server, wherein the data center includes a controller that is to provide the SLA associated with the virtualized execution environment and cause the virtualized execution environment to be launched on the server.

The invention claimed is:

1. At least one non-transitory computer-readable medium comprising instructions stored thereon that if executed, cause on or more processors to:
   execute a driver that is to:
      negotiate device capabilities available to a virtualized execution environment with a control plane, wherein the device comprises a network interface device and a processor to execute the control plane and
      provide access, by the virtualized execution environment, to fewer capabilities of the device than capabilities available from the device based on a service level agreement (SLA) associated with the virtualized execution environment.

2. The computer-readable medium of claim 1, wherein the driver advertises requested capabilities of the virtualized execution environment.

3. The computer-readable medium of claim 1, wherein the control plane sets available capabilities based on the SLA.

4. The computer-readable medium of claim 1, wherein the control plane applies one or more access control lists (ACLs) to limit device capabilities usable by the virtualized execution environment.

5. The computer-readable medium of claim 1, wherein the device capabilities comprise one or more of: checksum performance offload to a device, packet segmentation offload performance to the device, use of multiple cores to process traffic using multiple queues, receive side scaling (RSS) input set determination at the device, header split offset performance at the device, receive (RX) descriptor formats supported by the virtualized execution environment, transmit (TX) descriptors supported by the virtualized execution environment, Receive Side Coalescing performance offload to the device, remote direct memory access (RDMA) performance by a device, cryptographic operations performance by the device, multi-channel support by the device, number of interrupt vectors supported by the device, number of virtual ports (vports) supported by a device, or queues per vport supported by the device.

6. The computer-readable medium of claim 1, wherein the device comprises one or more of: a central processing unit (CPU), graphics processing unit (GPU), memory device, storage device, storage controller, accelerator, a cryptographic accelerator device, infrastructure processing unit (IPU), data processing unit (DPU), smartNIC, or fabric interface.

7. A method comprising:
   at a virtual device driver:
      negotiating capabilities of a device available to a virtualized execution environment by communication with a control plane executed by the device, wherein the device comprises a network interface device and a processor to execute the control plane and
      limiting capabilities of the device available to the virtualized execution environment based on a service level agreement (SLA) associated with the virtualized execution environment.

8. The method of claim 7, wherein the virtual device driver advertises device capabilities requested by the virtualized execution environment.

9. The method of claim 7, wherein the control plane sets capabilities of the device available to a virtualized execution environment based on the SLA.

10. The method of claim 7, wherein the control plane applies one or more access control lists (ACLs) to limit device capabilities usable by the virtualized execution environment.

11. The method of claim 7, wherein the capabilities of the device comprise one or more of: checksum performance offload to the device, packet segmentation offload performance to the device, use of multiple cores to process traffic using multiple queues, receive side scaling (RSS) input set determination at the device, header split offset performance at the device, receive (RX) descriptor formats supported by the virtualized execution environment, transmit (TX) descriptors supported by the virtualized execution environment, Receive Side Coalescing performance offload to the device, remote direct memory access (RDMA) performance by a device, cryptographic operations performance by the device, multi-channel support by the device, number of interrupt vectors supported by the device, number of virtual ports (vports) supported by a device, or queues per vport supported by the device.

12. The method of claim 7, wherein the device comprises one or more of: a central processing unit (CPU), graphics processing unit (GPU), memory device, storage device, storage controller, accelerator, a cryptographic accelerator device, infrastructure processing unit (IPU), data processing unit (DPU), smartNIC, or fabric interface.

13. An apparatus comprising:
   one or more processors, when operational, to execute instructions stored in memory device, to cause performance of:
   execute a driver that is to:
      negotiate capabilities of device with a control plane for a virtualized execution environment, wherein the device comprises a network interface device and a processor to execute the control plane and limit capabilities of the device available to the virtualized execution environment based on a service level agreement (SLA) associated with the virtualized execution environment.

14. The apparatus of claim 13, wherein the driver is to advertise device capabilities requested by the virtualized execution environment.

15. The apparatus of claim 13, wherein the control plane is to set capabilities of the device available to the virtualized execution environment based on the SLA.

16. The apparatus of claim 13, wherein the control plane is to apply one or more access control lists (ACLs) to limit device capabilities usable by the virtualized execution environment.

17. The apparatus of claim 13, wherein the device capabilities comprise one or more of:

checksum performance offload to the device, packet segmentation offload performance to the device, use of multiple cores to process traffic using multiple queues, receive side scaling (RSS) input set determination at the device, header split offset performance at the device, receive (RX) descriptor formats supported by the virtualized execution environment, transmit (TX) descriptors supported by the virtualized execution environment, Receive Side Coalescing performance offload to the device, remote direct memory access (RDMA) performance by a device, cryptographic operations performance by the device, multi-channel support by the device, number of interrupt vectors supported by the device, number of virtual ports (vports) supported by a device, or queues per vport supported by the device.

18. The apparatus of claim 13, wherein the device comprises one or more of: a central processing unit (CPU), graphics processing unit (GPU), memory device, storage device, storage controller, accelerator, a cryptographic accelerator device, infrastructure processing unit (IPU), data processing unit (DPU), smartNIC, or fabric interface.

19. The apparatus of claim 13, comprising a server coupled to the device, wherein the server is to execute the virtualized execution environment.

20. The apparatus of claim 19, comprising a data center coupled to the server, wherein the data center includes a controller that is to provide the SLA associated with the virtualized execution environment and cause the virtualized execution environment to be launched on the server.

* * * * *